US012495042B2

(12) United States Patent
Zarakas et al.

(10) Patent No.: US 12,495,042 B2
(45) Date of Patent: Dec. 9, 2025

(54) SYSTEMS AND METHODS FOR RESETTING AN AUTHENTICATION COUNTER

(71) Applicant: Capital One Services, LLC, McLean, VA (US)

(72) Inventors: James Zarakas, Centreville, VA (US); George Bergeron, McLean, VA (US); Adam Vukich, Alexandria, VA (US)

(73) Assignee: Capital One Services, LLC, McLean, VA (US)

( * ) Notice: Subject to any disclaimer, the term of this patent is extended or adjusted under 35 U.S.C. 154(b) by 530 days.

(21) Appl. No.: 17/403,470

(22) Filed: Aug. 16, 2021

(65) Prior Publication Data

US 2023/0046788 A1    Feb. 16, 2023

(51) Int. Cl.
*H04L 9/40*       (2022.01)
*G06K 19/077*     (2006.01)
*G06Q 20/34*      (2012.01)
*G06Q 20/40*      (2012.01)
(Continued)

(52) U.S. Cl.
CPC .......... *H04L 63/10* (2013.01); *G06K 19/0772* (2013.01); *G06Q 20/343* (2013.01); *G06Q 20/356* (2013.01); *G06Q 20/401* (2013.01); *G06Q 20/4093* (2013.01);
(Continued)

(58) Field of Classification Search
None
See application file for complete search history.

(56) References Cited

U.S. PATENT DOCUMENTS 3,668,631 A * 6/1972 Griffith ............... G06F 11/1012
                                                714/E11.042
3,668,632 A * 6/1972 Oldham, III ........ G06F 11/1008
                                                       714/775
(Continued)

FOREIGN PATENT DOCUMENTS

CA          3010336      7/2017
CN          101192295    6/2008
(Continued)

OTHER PUBLICATIONS

Bare et al "Hardware Performance Counter-Based Problem Diagnosis for e-Commerce Systems," IEEE, pp. 551-558 (Year: 2010).*
(Continued)

*Primary Examiner* — Luu T Pham
*Assistant Examiner* — James J Wilcox
(74) *Attorney, Agent, or Firm* — KDW Firm PLLC; Andrew D. Kasnevich

(57) ABSTRACT

Systems and methods for counter resynchronization can include one or more servers each including a memory and one or more processors. The one or more servers can be in data communication with a transmitting device. The one or more processors can be configured to determine one or more reset events. The one or more processors can be configured to generate a resync value. The one or more processors can be configured to transmit, via one or more scripts, the resync value to the transmitting device according to one or more prioritization factors and in response to the one or more reset events. The one or more processors can be configured to replace the counter value with the resync value in accordance with the one or more prioritization factors.

20 Claims, 6 Drawing Sheets

(51) Int. Cl.
  *G06F 21/35* (2013.01)
  *H04L 9/12* (2006.01)
(52) U.S. Cl.
  CPC .............. *H04L 63/18* (2013.01); *G06F 21/35* (2013.01); *H04L 9/12* (2013.01)

(56) References Cited

U.S. PATENT DOCUMENTS

| | | | | |
|---|---|---|---|---|
| 3,673,576 A * | 6/1972 | Donaldson, Jr. | ........ | G06F 13/32 710/20 |
| 3,803,594 A * | 4/1974 | Klein | ........ | G08B 25/04 340/533 |
| 3,854,010 A * | 12/1974 | Yoshino | ........ | H04N 1/00098 370/468 |
| 3,892,957 A * | 7/1975 | Bryant | ........ | G11C 17/126 708/190 |
| 3,921,142 A * | 11/1975 | Bryant | ........ | G01R 31/317 714/719 |
| 3,932,846 A * | 1/1976 | Brixey | ........ | G01R 31/317 708/130 |
| 3,934,233 A * | 1/1976 | Fisher | ........ | G01R 31/317 326/62 |
| 3,946,216 A * | 3/1976 | Van Dierendonck | .. | G11C 17/12 713/321 |
| 3,987,416 A * | 10/1976 | Vandierendonck | ..... | G06F 15/02 341/26 |
| 3,999,050 A * | 12/1976 | Pitroda | ........ | G06F 15/0266 968/936 |
| 4,025,765 A * | 5/1977 | Giras | ........ | F01D 17/24 290/40 R |
| 4,125,871 A | 11/1978 | Martin | | |
| 4,125,894 A * | 11/1978 | Cashel | ........ | G06F 11/0763 714/E11.006 |
| 4,141,071 A * | 2/1979 | Yerkes | ........ | B21B 37/165 72/8.9 |
| 4,167,785 A * | 9/1979 | McReynolds | ........ | G08G 1/082 700/83 |
| 4,213,174 A * | 7/1980 | Morley | ........ | G05B 19/05 700/16 |
| 4,267,458 A * | 5/1981 | Uram | ........ | G06K 13/0825 290/40 R |
| 4,311,998 A * | 1/1982 | Matherat | ........ | G09G 1/10 345/441 |
| 4,326,098 A * | 4/1982 | Bouricius | ........ | H04L 9/3247 705/75 |
| 4,329,033 A * | 5/1982 | Masunaga | ........ | G02B 7/30 396/281 |
| RE31,044 E * | 9/1982 | McReynolds | ........ | G08G 1/082 700/83 |
| 4,399,535 A * | 8/1983 | Southard | ........ | H04Q 1/4575 370/525 |
| 4,412,285 A * | 10/1983 | Neches | ........ | H04L 69/00 719/310 |
| 4,507,687 A * | 3/1985 | Hirota | ........ | H04N 5/935 386/314 |
| 4,512,656 A * | 4/1985 | Shinoda | ........ | G03B 7/16 396/227 |
| 4,674,652 A * | 6/1987 | Aten | ........ | A61J 7/04 221/265 |
| 4,683,553 A | 7/1987 | Mollier | | |
| 4,827,113 A | 5/1989 | Rikuna | | |
| 4,896,370 A * | 1/1990 | Kasparian | ........ | H04B 1/38 455/566 |
| 4,907,175 A * | 3/1990 | Van Alphen | ........ | G08B 13/04 340/552 |
| 4,910,773 A | 3/1990 | Hazard et al. | | |
| 4,926,105 A * | 5/1990 | Mischenko | ........ | H02P 21/06 318/800 |
| 4,979,054 A * | 12/1990 | McCullough | ........ | G06F 3/0601 360/48 |
| 5,003,488 A * | 3/1991 | Hardy | ........ | G01N 15/04 702/50 |
| 5,014,237 A * | 5/1991 | Masters | ........ | G11B 19/00 |
| 5,016,121 A * | 5/1991 | Peddle | ........ | G11B 20/10 360/78.04 |
| 5,036,461 A | 7/1991 | Elliott et al. | | |
| 5,048,085 A * | 9/1991 | Abraham | ........ | G06F 21/34 711/E12.07 |
| 5,063,536 A * | 11/1991 | Tinder | ........ | G06F 9/22 712/E9.004 |
| 5,075,805 A * | 12/1991 | Peddle | ........ | G06F 3/0601 |
| 5,148,481 A * | 9/1992 | Abraham | ........ | H04L 63/102 708/250 |
| 5,260,689 A * | 11/1993 | Meyers | ........ | A63C 11/005 340/521 |
| 5,295,265 A * | 3/1994 | Ducateau | ........ | G06F 9/4887 718/107 |
| 5,327,520 A * | 7/1994 | Chen | ........ | G10L 19/12 704/200 |
| 5,363,448 A | 11/1994 | Koopman, Jr. et al. | | |
| 5,377,270 A | 12/1994 | Koopman, Jr. et al. | | |
| 5,493,571 A * | 2/1996 | Engdahl | ........ | H04L 25/4904 370/514 |
| 5,533,126 A | 7/1996 | Hazard | | |
| 5,537,314 A | 7/1996 | Kanter | | |
| 5,589,827 A * | 12/1996 | Scurati | ........ | G08G 1/163 340/901 |
| 5,590,038 A | 12/1996 | Pitroda | | |
| 5,592,553 A | 1/1997 | Guski et al. | | |
| 5,616,901 A | 4/1997 | Crandall | | |
| 5,666,415 A | 9/1997 | Kaufman | | |
| 5,671,146 A * | 9/1997 | Windel | ........ | G07B 17/00733 705/410 |
| 5,675,554 A * | 10/1997 | Cole | ........ | G01S 7/52019 367/138 |
| 5,677,899 A * | 10/1997 | Getreuer | ........ | G11B 7/0935 |
| 5,687,368 A * | 11/1997 | Nilsen | ........ | G06F 12/0269 |
| 5,729,511 A * | 3/1998 | Schell | ........ | G11B 7/08582 369/44.29 |
| 5,734,722 A | 3/1998 | Halpern | | |
| 5,748,578 A * | 5/1998 | Schell | ........ | G11B 7/0908 369/44.14 |
| 5,764,789 A | 6/1998 | Pare, Jr. et al. | | |
| 5,768,373 A | 6/1998 | Lohstroh et al. | | |
| 5,778,072 A | 7/1998 | Samar | | |
| 5,796,827 A | 8/1998 | Coppersmith et al. | | |
| 5,832,090 A | 11/1998 | Raspotnik | | |
| 5,883,810 A | 3/1999 | Franklin et al. | | |
| 5,892,900 A * | 4/1999 | Ginter | ........ | H04L 63/20 726/26 |
| 5,901,874 A | 5/1999 | Deters | | |
| 5,910,987 A * | 6/1999 | Ginter | ........ | H04L 63/083 705/52 |
| 5,920,539 A * | 7/1999 | Schell | ........ | G11B 7/0917 |
| 5,929,413 A | 7/1999 | Gardner | | |
| 5,960,411 A | 9/1999 | Hartman et al. | | |
| 5,999,561 A * | 12/1999 | Naden | ........ | H04B 1/707 375/142 |
| 6,009,093 A * | 12/1999 | Choe | ........ | H04Q 11/0457 370/376 |
| 6,021,203 A | 2/2000 | Douceur et al. | | |
| 6,049,328 A | 4/2000 | Vanderheiden | | |
| 6,057,101 A * | 5/2000 | Nandabalan | ........ | C12N 15/81 506/10 |
| 6,058,373 A | 5/2000 | Blinn et al. | | |
| 6,061,666 A | 5/2000 | Do et al. | | |
| 6,069,857 A * | 5/2000 | Schell | ........ | G11B 11/10576 369/53.28 |
| 6,091,684 A * | 7/2000 | Schell | ........ | G11B 19/28 369/53.3 |
| 6,097,967 A | 8/2000 | Hubbe et al. | | |
| 6,105,013 A | 8/2000 | Curry et al. | | |
| 6,185,652 B1 * | 2/2001 | Shek | ........ | G06F 13/24 710/266 |
| 6,199,114 B1 | 3/2001 | White et al. | | |
| 6,199,762 B1 | 3/2001 | Hohle | | |
| 6,216,227 B1 | 4/2001 | Goldstein et al. | | |
| 6,227,447 B1 | 5/2001 | Campisano | | |

(56) References Cited

U.S. PATENT DOCUMENTS

| | | | |
|---|---|---|---|
| 6,236,625 B1 * | 5/2001 | Schell | G11B 11/10595 |
| | | | 369/13.22 |
| 6,282,522 B1 | 8/2001 | Davis et al. | |
| 6,324,271 B1 | 11/2001 | Sawyer et al. | |
| 6,342,844 B1 | 1/2002 | Rozin | |
| 6,353,604 B2 * | 3/2002 | Grimwood | H04J 3/0682 |
| | | | 370/335 |
| 6,367,011 B1 | 4/2002 | Lee et al. | |
| 6,402,028 B1 | 6/2002 | Graham, Jr. et al. | |
| 6,412,077 B1 * | 6/2002 | Roden | H04L 67/60 |
| | | | 714/4.21 |
| 6,434,087 B1 * | 8/2002 | Schell | G11B 11/10506 |
| | | | 369/13.02 |
| 6,438,550 B1 | 8/2002 | Doyle et al. | |
| 6,457,642 B1 * | 10/2002 | Good | G07G 1/0054 |
| | | | 235/462.35 |
| 6,501,847 B2 | 12/2002 | Helot et al. | |
| 6,502,135 B1 * | 12/2002 | Munger | H04L 45/243 |
| | | | 709/225 |
| 6,554,189 B1 * | 4/2003 | Good | G06K 7/109 |
| | | | 235/462.31 |
| 6,572,015 B1 | 6/2003 | Norton | |
| 6,587,867 B1 * | 7/2003 | Miller | H04Q 3/0033 |
| | | | 709/200 |
| 6,619,550 B1 * | 9/2003 | Good | G06K 7/10871 |
| | | | 235/472.01 |
| 6,622,017 B1 | 9/2003 | Hoffman | |
| 6,625,500 B1 * | 9/2003 | Li | G05B 13/021 |
| | | | 706/45 |
| 6,631,197 B1 | 10/2003 | Taenzer | |
| 6,641,050 B2 | 11/2003 | Kelley et al. | |
| 6,655,585 B2 | 12/2003 | Shinn | |
| 6,662,020 B1 | 12/2003 | Aaro et al. | |
| 6,705,526 B1 * | 3/2004 | Zhu | G06K 7/10811 |
| | | | 235/472.01 |
| 6,721,706 B1 | 4/2004 | Strubbe et al. | |
| 6,731,778 B1 | 5/2004 | Oda et al. | |
| 6,734,581 B1 * | 5/2004 | Griffis | H01H 47/002 |
| | | | 192/129 R |
| 6,760,276 B1 * | 7/2004 | Karr | G10K 15/02 |
| | | | 340/7.49 |
| 6,775,725 B1 | 8/2004 | Basquin et al. | |
| 6,779,115 B1 | 8/2004 | Naim | |
| 6,792,533 B2 | 9/2004 | Jablon | |
| 6,826,616 B2 * | 11/2004 | Larson | H04L 61/5076 |
| | | | 709/227 |
| 6,829,711 B1 | 12/2004 | Kwok et al. | |
| 6,834,271 B1 | 12/2004 | Hodgson et al. | |
| 6,834,795 B1 | 12/2004 | Rasmussen et al. | |
| 6,852,031 B1 | 2/2005 | Rowe | |
| 6,865,547 B1 | 3/2005 | Brake, Jr. et al. | |
| 6,873,260 B2 | 3/2005 | Lancos et al. | |
| 6,877,656 B1 | 4/2005 | Jaros et al. | |
| 6,882,315 B2 * | 4/2005 | Richley | G01S 5/06 |
| | | | 342/465 |
| 6,889,198 B2 | 5/2005 | Kawan | |
| 6,905,411 B2 | 6/2005 | Nguyen et al. | |
| 6,910,627 B1 | 6/2005 | Simpson-Young et al. | |
| 6,971,031 B2 | 11/2005 | Haala | |
| 6,990,588 B1 | 1/2006 | Yasukura | |
| 7,006,986 B1 | 2/2006 | Sines et al. | |
| 7,020,696 B1 * | 3/2006 | Perry | H04L 43/0817 |
| | | | 709/227 |
| 7,085,931 B1 | 8/2006 | Smith et al. | |
| 7,127,605 B1 | 10/2006 | Montgomery et al. | |
| 7,128,274 B2 | 10/2006 | Kelley et al. | |
| 7,136,999 B1 * | 11/2006 | Griffiths | H04L 63/08 |
| | | | 713/168 |
| 7,140,550 B2 | 11/2006 | Ramachandran | |
| 7,152,045 B2 | 12/2006 | Hoffman | |
| 7,155,263 B1 * | 12/2006 | Bergamo | H04W 52/0229 |
| | | | 455/343.1 |
| 7,165,727 B2 | 1/2007 | de Jong | |
| 7,175,076 B1 | 2/2007 | Block et al. | |
| 7,178,025 B2 * | 2/2007 | Scheidt | H04L 63/062 |
| | | | 713/168 |
| 7,202,773 B1 | 4/2007 | Oba et al. | |
| 7,206,806 B2 | 4/2007 | Pineau | |
| 7,232,073 B1 | 6/2007 | de Jong | |
| 7,246,752 B2 | 7/2007 | Brown | |
| 7,252,242 B2 | 8/2007 | Ho | |
| 7,254,569 B2 | 8/2007 | Goodman et al. | |
| 7,263,507 B1 | 8/2007 | Brake, Jr. et al. | |
| 7,266,595 B1 * | 9/2007 | Black | H04L 63/105 |
| | | | 715/744 |
| 7,270,276 B2 | 9/2007 | Vayssiere | |
| 7,278,025 B2 | 10/2007 | Saito et al. | |
| 7,287,692 B1 | 10/2007 | Patel et al. | |
| 7,290,709 B2 | 11/2007 | Tsai et al. | |
| 7,306,143 B2 | 12/2007 | Bonneau, Jr. et al. | |
| 7,319,986 B2 | 1/2008 | Praisner et al. | |
| 7,325,132 B2 | 1/2008 | Takayama et al. | |
| 7,373,515 B2 | 5/2008 | Owen et al. | |
| 7,374,099 B2 | 5/2008 | de Jong | |
| 7,375,616 B2 | 5/2008 | Rowse et al. | |
| 7,380,710 B2 | 6/2008 | Brown | |
| 7,391,028 B1 * | 6/2008 | Rubenstein | G01T 7/00 |
| | | | 250/370.08 |
| 7,418,504 B2 * | 8/2008 | Larson | H04L 63/0421 |
| 7,424,977 B2 | 9/2008 | Smets et al. | |
| 7,453,439 B1 | 11/2008 | Kushler et al. | |
| 7,461,099 B1 * | 12/2008 | Sharpe | G06F 16/907 |
| 7,469,341 B2 * | 12/2008 | Edgett | H04L 63/0428 |
| | | | 726/28 |
| 7,472,829 B2 | 1/2009 | Brown | |
| 7,481,373 B2 | 1/2009 | Cricco | |
| 7,487,357 B2 | 2/2009 | Smith et al. | |
| 7,490,031 B1 * | 2/2009 | Qiu | G06F 8/38 |
| | | | 703/22 |
| 7,506,165 B2 | 3/2009 | Kocher et al. | |
| 7,527,208 B2 | 5/2009 | Hammad | |
| 7,539,489 B1 * | 5/2009 | Alexander | H04W 24/06 |
| | | | 455/67.11 |
| 7,568,631 B2 | 8/2009 | Gibbs et al. | |
| 7,584,153 B2 | 9/2009 | Brown et al. | |
| 7,597,250 B2 | 10/2009 | Finn | |
| 7,603,700 B2 * | 10/2009 | Cheng | H04L 63/08 |
| | | | 713/157 |
| 7,606,575 B2 * | 10/2009 | Mahany | H04W 52/343 |
| | | | 455/452.2 |
| 7,607,164 B2 * | 10/2009 | Vasishth | G06F 21/62 |
| | | | 709/225 |
| 7,613,822 B2 * | 11/2009 | Joy | H04L 67/1001 |
| | | | 709/227 |
| 7,628,322 B2 | 12/2009 | Holtmanns et al. | |
| 7,652,578 B2 | 1/2010 | Braun et al. | |
| 7,657,257 B2 | 2/2010 | Cricco et al. | |
| 7,680,997 B1 * | 3/2010 | Specht | G06F 11/26 |
| | | | 714/6.13 |
| 7,689,832 B2 | 3/2010 | Talmor et al. | |
| 7,703,142 B1 | 4/2010 | Wilson et al. | |
| 7,734,884 B1 * | 6/2010 | Marshak | G06F 11/2071 |
| | | | 711/167 |
| 7,748,609 B2 | 7/2010 | Sachdeva et al. | |
| 7,748,617 B2 | 7/2010 | Gray | |
| 7,748,636 B2 | 7/2010 | Finn | |
| 7,762,457 B2 | 7/2010 | Bonalle et al. | |
| RE41,739 E * | 9/2010 | Lester | H02J 13/0001 |
| | | | 340/310.17 |
| 7,789,302 B2 | 9/2010 | Tame | |
| 7,793,851 B2 | 9/2010 | Mullen | |
| 7,796,013 B2 | 9/2010 | Murakami et al. | |
| 7,801,799 B1 | 9/2010 | Brake, Jr. et al. | |
| 7,801,829 B2 | 9/2010 | Gray et al. | |
| 7,805,755 B2 | 9/2010 | Brown et al. | |
| 7,809,643 B2 | 10/2010 | Phillips et al. | |
| 7,827,115 B2 | 11/2010 | Weller et al. | |
| 7,828,214 B2 | 11/2010 | Narendra et al. | |
| 7,839,926 B1 * | 11/2010 | Metzger | H04N 7/181 |
| | | | 375/240.26 |
| 7,848,746 B2 | 12/2010 | Juels | |

(56) References Cited

U.S. PATENT DOCUMENTS

| | | | |
|---|---|---|---|
| 7,882,553 B2 | 2/2011 | Tuliani | |
| 7,896,236 B2 | 3/2011 | Sakamura | |
| 7,900,048 B2 | 3/2011 | Andersson | |
| 7,908,216 B1 | 3/2011 | Davis et al. | |
| 7,921,290 B2 * | 4/2011 | Albert | H04L 63/108 |
| | | | 713/168 |
| 7,922,082 B2 | 4/2011 | Muscato | |
| 7,933,589 B1 | 4/2011 | Mamdani et al. | |
| 7,949,559 B2 | 5/2011 | Freiberg | |
| 7,954,716 B2 | 6/2011 | Narendra et al. | |
| 7,954,723 B2 | 6/2011 | Charrat | |
| 7,961,884 B2 * | 6/2011 | Edgett | H04L 63/108 |
| | | | 380/259 |
| 7,962,369 B2 | 6/2011 | Rosenberg | |
| 7,970,375 B2 | 6/2011 | Date et al. | |
| 7,984,499 B2 * | 7/2011 | Kitani | G11B 20/00753 |
| | | | 726/19 |
| 7,993,197 B2 | 8/2011 | Mamdani et al. | |
| 7,997,488 B2 * | 8/2011 | Isuyama | G06Q 20/40975 |
| | | | 235/449 |
| 8,005,426 B2 | 8/2011 | Huomo et al. | |
| 8,005,740 B2 * | 8/2011 | Arnott | G06Q 40/12 |
| | | | 705/36 R |
| 8,010,405 B1 | 8/2011 | Bortolin et al. | |
| RE42,762 E | 9/2011 | Shin | |
| 8,041,954 B2 | 10/2011 | Plesman | |
| 8,041,980 B2 * | 10/2011 | Uehata | H04L 9/3263 |
| | | | 713/500 |
| 8,060,012 B2 | 11/2011 | Sklovsky et al. | |
| 8,074,877 B2 | 12/2011 | Mullen et al. | |
| 8,082,450 B2 | 12/2011 | Frey et al. | |
| 8,095,113 B2 | 1/2012 | Kean et al. | |
| 8,099,332 B2 | 1/2012 | Lemay et al. | |
| 8,099,511 B1 * | 1/2012 | Ganesan | H04N 21/2225 |
| | | | 709/231 |
| 8,103,249 B2 | 1/2012 | Markison | |
| 8,108,687 B2 | 1/2012 | Ellis et al. | |
| 8,122,122 B1 * | 2/2012 | Clingenpeel | G06F 21/552 |
| | | | 709/224 |
| 8,127,143 B2 | 2/2012 | Abdallah et al. | |
| 8,135,648 B2 | 3/2012 | Oram et al. | |
| 8,140,010 B2 | 3/2012 | Symons et al. | |
| 8,141,136 B2 | 3/2012 | Lee et al. | |
| 8,150,321 B2 | 4/2012 | Winter et al. | |
| 8,150,767 B2 | 4/2012 | Wankmueller | |
| 8,186,602 B2 | 5/2012 | Itay et al. | |
| 8,190,891 B2 * | 5/2012 | Saito | H04L 63/061 |
| | | | 713/168 |
| 8,196,131 B1 | 6/2012 | von Behren et al. | |
| 8,214,901 B2 * | 7/2012 | Porras | G06F 21/566 |
| | | | 713/192 |
| 8,215,563 B2 | 7/2012 | Levy et al. | |
| 8,224,753 B2 | 7/2012 | Atef et al. | |
| 8,232,879 B2 | 7/2012 | Davis | |
| 8,233,841 B2 | 7/2012 | Griffin et al. | |
| 8,234,372 B2 * | 7/2012 | Knapp | G06F 16/10 |
| | | | 709/212 |
| 8,245,292 B2 | 8/2012 | Buer | |
| 8,249,654 B1 | 8/2012 | Zhu | |
| 8,260,913 B2 * | 9/2012 | Knapp | H04L 67/1008 |
| | | | 709/212 |
| 8,264,984 B2 * | 9/2012 | Nakano | H04L 69/163 |
| | | | 370/254 |
| 8,265,102 B2 * | 9/2012 | Joshi | H04B 1/70753 |
| | | | 370/518 |
| 8,266,451 B2 | 9/2012 | Leydier et al. | |
| 8,276,814 B1 | 10/2012 | Davis | |
| 8,285,329 B1 | 10/2012 | Zhu | |
| 8,295,198 B2 * | 10/2012 | Newman | H04L 63/1441 |
| | | | 370/253 |
| 8,301,118 B2 | 10/2012 | Li et al. | |
| 8,302,872 B2 | 11/2012 | Mullen | |
| 8,312,519 B1 | 11/2012 | Bailey et al. | |
| 8,316,237 B1 | 11/2012 | Felsher et al. | |
| 8,328,559 B2 * | 12/2012 | Sambucetti | G09B 19/00 |
| | | | 434/350 |
| 8,332,272 B2 | 12/2012 | Fisher | |
| 8,346,670 B2 | 1/2013 | Hasson | |
| 8,365,988 B1 | 2/2013 | Medina, III et al. | |
| 8,369,960 B2 | 2/2013 | Tran et al. | |
| 8,371,501 B1 | 2/2013 | Hopkins | |
| 8,381,307 B2 | 2/2013 | Cimino | |
| 8,391,719 B2 | 3/2013 | Alameh et al. | |
| 8,417,231 B2 | 4/2013 | Sanding et al. | |
| 8,439,271 B2 | 5/2013 | Smets et al. | |
| 8,442,817 B2 * | 5/2013 | Naka | G10L 25/78 |
| | | | 704/207 |
| 8,475,367 B1 | 7/2013 | Yuen et al. | |
| 8,489,112 B2 | 7/2013 | Roeding et al. | |
| 8,511,542 B2 | 8/2013 | Pan | |
| 8,511,547 B2 | 8/2013 | Rans | |
| 8,519,822 B2 | 8/2013 | Riegebauer | |
| 8,538,476 B2 | 9/2013 | Besay | |
| 8,540,149 B1 * | 9/2013 | Chu | G06K 7/14 |
| | | | 235/487 |
| 8,548,166 B2 * | 10/2013 | Wasilewski | H04L 63/0428 |
| | | | 380/240 |
| 8,559,872 B2 | 10/2013 | Butler | |
| 8,566,916 B1 | 10/2013 | Vernon et al. | |
| 8,567,670 B2 | 10/2013 | Stanfield et al. | |
| 8,572,386 B2 | 10/2013 | Takekawa et al. | |
| 8,577,280 B2 * | 11/2013 | Hutchinson | G06Q 10/06311 |
| | | | 434/323 |
| 8,577,810 B1 | 11/2013 | Dalit et al. | |
| 8,582,567 B2 * | 11/2013 | Kurapati | H04M 7/0078 |
| | | | 370/352 |
| 8,583,454 B2 | 11/2013 | Beraja et al. | |
| 8,589,335 B2 | 11/2013 | Smith et al. | |
| 8,589,970 B2 * | 11/2013 | Teraoka | H04L 63/0428 |
| | | | 725/31 |
| 8,594,730 B2 | 11/2013 | Bona et al. | |
| 8,601,277 B2 * | 12/2013 | Asami | G06F 21/34 |
| | | | 726/4 |
| 8,615,468 B2 | 12/2013 | Varadarajan | |
| 8,620,218 B2 | 12/2013 | Awad | |
| 8,639,625 B1 * | 1/2014 | Ginter | G06F 21/78 |
| | | | 705/50 |
| 8,667,285 B2 | 3/2014 | Coulier et al. | |
| 8,688,583 B2 * | 4/2014 | Boccon-Gibod | H04L 63/08 |
| | | | 705/50 |
| 8,706,943 B2 | 4/2014 | Kim et al. | |
| 8,713,626 B2 * | 4/2014 | Cam-Winget | H04L 9/32 |
| | | | 726/1 |
| 8,719,223 B2 * | 5/2014 | Knapp | G06F 16/184 |
| | | | 707/626 |
| 8,723,941 B1 | 5/2014 | Shirbabadi et al. | |
| 8,726,405 B1 | 5/2014 | Bailey et al. | |
| 8,740,073 B2 | 6/2014 | Shankar et al. | |
| 8,750,514 B2 | 6/2014 | Gallo et al. | |
| 8,752,189 B2 | 6/2014 | De Jong | |
| 8,794,509 B2 | 8/2014 | Bishop et al. | |
| 8,797,969 B1 * | 8/2014 | Harel | H04B 7/024 |
| | | | 370/328 |
| 8,799,668 B2 | 8/2014 | Cheng | |
| 8,806,219 B2 * | 8/2014 | Relyea | G06F 21/31 |
| | | | 713/182 |
| 8,806,592 B2 | 8/2014 | Ganesan | |
| 8,807,440 B1 | 8/2014 | Von Behren et al. | |
| 8,811,892 B2 | 8/2014 | Khan et al. | |
| 8,814,039 B2 | 8/2014 | Bishop et al. | |
| 8,814,052 B2 | 8/2014 | Bona et al. | |
| 8,818,867 B2 | 8/2014 | Baldwin et al. | |
| 8,838,973 B1 | 9/2014 | Yung et al. | |
| 8,850,538 B1 | 9/2014 | Vernon et al. | |
| 8,861,733 B2 | 10/2014 | Benteo et al. | |
| 8,870,081 B2 | 10/2014 | Olson | |
| 8,880,027 B1 | 11/2014 | Darringer | |
| 8,888,002 B2 | 11/2014 | Chesney et al. | |
| 8,898,088 B2 | 11/2014 | Springer et al. | |
| 8,914,851 B2 * | 12/2014 | Fakhrai | H04L 63/0815 |
| | | | 726/4 |
| 8,934,837 B2 | 1/2015 | Zhu et al. | |

(56) References Cited

U.S. PATENT DOCUMENTS

| | | |
|---|---|---|
| 8,943,309 B1 * | 1/2015 | Schilder .............. H04L 63/0807 |
| | | 713/182 |
| 8,977,569 B2 | 3/2015 | Rao |
| 8,983,069 B2 * | 3/2015 | Merchan ................... H04L 9/12 |
| | | 380/37 |
| 8,994,498 B2 | 3/2015 | Agrafioti et al. |
| 9,004,365 B2 | 4/2015 | Bona et al. |
| 9,031,880 B2 * | 5/2015 | Bishop ................. G06Q 20/327 |
| | | 705/72 |
| 9,038,893 B2 | 5/2015 | Kirkham |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,071,576 B1 * | 6/2015 | Earl .................... H04L 63/0236 |
| 9,081,948 B2 | 7/2015 | Magne |
| 9,094,615 B2 * | 7/2015 | Aman .................... G06Q 30/02 |
| 9,104,853 B2 | 8/2015 | Mathur et al. |
| 9,118,663 B1 | 8/2015 | Bailey et al. |
| 9,122,964 B2 | 9/2015 | Krawczewicz |
| 9,129,199 B2 | 9/2015 | Spodak |
| 9,129,280 B2 | 9/2015 | Bona et al. |
| 9,152,832 B2 | 10/2015 | Royston et al. |
| 9,171,344 B2 * | 10/2015 | Yu ........................... H04L 67/01 |
| 9,183,490 B2 | 11/2015 | Moreton |
| 9,203,800 B2 | 12/2015 | Izu et al. |
| 9,209,867 B2 | 12/2015 | Royston |
| 9,231,948 B1 * | 1/2016 | Gabrielson ............ H04L 63/18 |
| 9,251,330 B2 | 2/2016 | Boivie et al. |
| 9,251,518 B2 | 2/2016 | Levin et al. |
| 9,258,124 B2 * | 2/2016 | M'Raihi ............... H04L 9/3234 |
| 9,258,715 B2 | 2/2016 | Borghei |
| 9,270,337 B2 | 2/2016 | Zhu et al. |
| 9,271,184 B2 * | 2/2016 | Raleigh ................... H04L 47/19 |
| 9,275,325 B2 | 3/2016 | Newcombe |
| 9,286,606 B2 | 3/2016 | Diamond |
| 9,292,711 B1 * | 3/2016 | Roth ........................ G06F 21/34 |
| 9,306,626 B2 | 4/2016 | Hall et al. |
| 9,306,753 B1 | 4/2016 | Vandervort et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,374,368 B1 * | 6/2016 | Roth ...................... H04L 63/123 |
| 9,379,841 B2 | 6/2016 | Fine et al. |
| 9,396,450 B2 * | 7/2016 | Gazdzinski ............ G04G 21/04 |
| 9,407,624 B1 * | 8/2016 | Myers ................... H04L 63/105 |
| 9,412,135 B2 * | 8/2016 | Smith .................... G06Q 20/023 |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,444,796 B2 * | 9/2016 | Chen ...................... H04L 63/061 |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,501,776 B2 | 11/2016 | Martin |
| 9,553,637 B2 | 1/2017 | Yang et al. |
| 9,571,275 B1 * | 2/2017 | Pattan .................... H04L 47/748 |
| 9,619,952 B1 | 4/2017 | Zhao et al. |
| 9,626,667 B2 * | 4/2017 | Boccon-Gibod ....... H04L 63/10 |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,692,756 B2 * | 6/2017 | Poisner ................ H04L 63/0861 |
| 9,705,336 B2 * | 7/2017 | Feng ...................... G06Q 50/06 |
| 9,710,744 B2 | 7/2017 | Wurmfeld |
| 9,710,804 B2 | 7/2017 | Zhou et al. |
| 9,727,832 B2 * | 8/2017 | D'Amico ............ G06Q 30/0219 |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,883,404 B2 * | 1/2018 | Malladi .................... H04L 5/001 |
| 9,888,037 B1 * | 2/2018 | Sharifi Mehr ........ H04L 63/205 |
| 9,891,823 B2 | 2/2018 | Feng et al. |
| 9,940,571 B1 | 4/2018 | Herrington |
| 9,949,065 B1 | 4/2018 | Zarakas |
| 9,953,323 B2 | 4/2018 | Candelore et al. |
| 9,961,194 B1 | 5/2018 | Wiechman et al. |
| 9,961,542 B2 * | 5/2018 | Rajadurai ........... H04W 12/033 |
| 9,965,632 B2 | 5/2018 | Zarakas |
| 9,965,756 B2 | 5/2018 | Davis et al. |
| 9,965,911 B2 | 5/2018 | Wishne |
| 9,977,890 B2 | 5/2018 | Alberti |
| 9,978,056 B2 | 5/2018 | Seo |
| 9,978,058 B2 | 5/2018 | Wurmfeld et al. |
| 9,979,625 B2 * | 5/2018 | McLaughlin ......... H04L 9/0861 |
| 9,985,786 B1 * | 5/2018 | Bhabbur ................ G06F 3/0488 |
| 9,990,795 B2 | 6/2018 | Wurmfeld |
| 10,007,873 B2 | 6/2018 | Heo |
| 10,013,693 B2 | 7/2018 | Wyatt |
| 10,027,639 B2 * | 7/2018 | Yoshimi .................... H04L 9/12 |
| 10,043,164 B2 | 8/2018 | Dogin et al. |
| 10,044,716 B2 * | 8/2018 | Hilliar ................... H04L 9/3228 |
| 10,057,070 B2 * | 8/2018 | Prabhu ................. H04L 9/3247 |
| 10,075,437 B1 | 9/2018 | Costigan et al. |
| 10,083,571 B2 * | 9/2018 | Frenkel ............... G07F 17/3227 |
| 10,084,601 B2 * | 9/2018 | Hostyn .................... H04L 63/18 |
| 10,091,242 B2 * | 10/2018 | Britt ...................... H04W 12/50 |
| 10,104,048 B2 * | 10/2018 | Jain ........................ H04L 69/22 |
| 10,110,583 B1 * | 10/2018 | Krstic .................... H04L 63/105 |
| 10,121,130 B2 | 11/2018 | Pinski |
| 10,129,648 B1 | 11/2018 | Hernandez et al. |
| 10,133,979 B1 | 11/2018 | Eidam et al. |
| 10,158,717 B2 * | 12/2018 | Kishikawa .............. H04L 63/10 |
| 10,193,890 B2 * | 1/2019 | Uchizumi ............. H04L 63/101 |
| 10,205,711 B2 * | 2/2019 | Mennes ................. H04L 63/083 |
| 10,210,505 B2 | 2/2019 | Zarakas |
| 10,217,105 B1 | 2/2019 | Sangi et al. |
| 10,242,368 B1 | 3/2019 | Poole |
| 10,282,726 B2 * | 5/2019 | Aabye ..................... G06Q 20/12 |
| 10,291,619 B2 * | 5/2019 | Odom ................ G06Q 20/1235 |
| 10,296,910 B1 | 5/2019 | Templeton |
| 10,326,591 B2 * | 6/2019 | Yuan ..................... H04L 9/3236 |
| 10,332,102 B2 | 6/2019 | Zarakas |
| 10,360,557 B2 | 7/2019 | Locke |
| 10,362,347 B1 * | 7/2019 | Rabii ....................... H04W 4/42 |
| 10,380,471 B2 | 8/2019 | Locke |
| 10,394,923 B2 * | 8/2019 | Kersting ................ G06N 5/022 |
| 10,395,244 B1 | 8/2019 | Mossler |
| 10,419,930 B2 * | 9/2019 | Holland ............... H04W 12/069 |
| 10,438,437 B1 | 10/2019 | Herrington et al. |
| 10,445,484 B2 * | 10/2019 | Taratine ................. H04W 4/80 |
| 10,445,487 B2 * | 10/2019 | Hon ....................... H04W 12/06 |
| 10,447,786 B1 * | 10/2019 | Arnberg ................. H04W 12/35 |
| 10,453,054 B2 | 10/2019 | Zarakas |
| 10,454,957 B2 * | 10/2019 | Ujiie .................... H04L 63/1416 |
| 10,462,138 B2 * | 10/2019 | Jhingran ................ G06F 21/629 |
| 10,474,941 B2 | 11/2019 | Wurmfeld |
| 10,475,027 B2 | 11/2019 | Guise |
| 10,482,453 B2 | 11/2019 | Zarakas |
| 10,482,457 B2 | 11/2019 | Poole |
| 10,489,774 B2 | 11/2019 | Zarakas |
| 10,489,781 B1 | 11/2019 | Osborn |
| 10,491,587 B2 * | 11/2019 | Hon ....................... G06F 16/951 |
| 10,510,070 B2 | 12/2019 | Wurmfeld |
| 10,511,573 B2 * | 12/2019 | Larson .................... H04L 63/10 |
| 10,515,361 B2 | 12/2019 | Zarakas |
| 10,523,708 B1 * | 12/2019 | Ilincic ................. H04L 63/0853 |
| 10,535,068 B2 | 1/2020 | Locke |
| 10,542,525 B2 * | 1/2020 | Atefi ..................... H04W 72/21 |
| 10,546,444 B2 | 1/2020 | Osborn |
| 10,564,970 B2 * | 2/2020 | Knowles .................. G06F 9/462 |
| 10,581,611 B1 | 3/2020 | Osborn |
| 10,586,369 B1 * | 3/2020 | Roche ..................... G10L 13/00 |

(56) References Cited

U.S. PATENT DOCUMENTS

| | | | |
|---|---|---|---|
| 10,601,818 B2* | 3/2020 | Le Saint | H04L 63/08 |
| 10,609,020 B2* | 3/2020 | Mattsson | H04W 8/005 |
| 10,631,040 B2* | 4/2020 | Britt | H04N 21/42202 |
| 10,652,240 B2* | 5/2020 | Brand | H04L 9/3268 |
| 10,664,830 B1 | 5/2020 | Rule | |
| 10,679,314 B2* | 6/2020 | Pronovost | G06T 1/20 |
| 10,685,349 B2 | 6/2020 | Brickell | |
| 10,757,574 B1* | 8/2020 | Rule | H04L 63/107 |
| 10,764,752 B1* | 9/2020 | Avetisov | H04W 12/08 |
| 10,769,299 B2* | 9/2020 | Rule | H04L 63/0861 |
| 10,778,661 B2* | 9/2020 | Mondello | H04L 9/12 |
| 10,797,882 B2 | 10/2020 | Rule | |
| 10,826,690 B2* | 11/2020 | Zhang | H04L 9/0825 |
| 10,834,050 B2* | 11/2020 | Call | G06F 21/629 |
| 10,880,741 B2 | 12/2020 | Zarakas | |
| 10,887,090 B2* | 1/2021 | Li | G06F 11/2023 |
| 10,909,525 B1 | 2/2021 | Dhodapkar | |
| 10,924,461 B2* | 2/2021 | Britt | H04L 63/045 |
| 10,949,478 B2* | 3/2021 | Kersting | G06F 16/953 |
| 10,951,652 B1* | 3/2021 | Sharifi Mehr | H04L 63/0807 |
| 10,970,691 B2 | 4/2021 | Koeppel | |
| 10,984,416 B2 | 4/2021 | Ilincic | |
| 10,990,109 B2* | 4/2021 | Nelson | G05D 1/0276 |
| 10,999,398 B1* | 5/2021 | Kumar | H04L 67/60 |
| 11,037,136 B2 | 6/2021 | Rule | |
| 11,062,098 B1 | 7/2021 | Bergeron | |
| 11,063,979 B1* | 7/2021 | Lunati | H04L 63/0236 |
| 11,082,223 B2* | 8/2021 | Ono | H04L 9/0861 |
| 11,093,437 B1 | 8/2021 | Pfiester | H04W 36/365 |
| 11,101,998 B2* | 8/2021 | Ono | H04L 9/12 |
| 11,103,768 B2* | 8/2021 | Shigeta | G07F 17/3241 |
| 11,120,453 B2 | 9/2021 | Rule | |
| 11,122,047 B2* | 9/2021 | Brand | G06F 21/33 |
| 11,134,102 B2* | 9/2021 | Raleigh | H04W 4/24 |
| 11,138,593 B1 | 10/2021 | Ho | |
| 11,138,605 B2 | 10/2021 | Aabye | |
| 11,153,317 B2* | 10/2021 | Kamath | G16H 10/60 |
| 11,170,875 B2* | 11/2021 | Byrom | G16H 10/20 |
| 11,171,955 B2* | 11/2021 | Shanbhogue | H04L 9/0631 |
| 11,176,540 B2 | 11/2021 | Gupta | |
| 11,188,908 B2 | 11/2021 | Locke | |
| 11,216,806 B2 | 1/2022 | Mossler | |
| 11,221,731 B2* | 1/2022 | Britt | G06F 3/0482 |
| 11,297,958 B2 | 4/2022 | Vukich | |
| 11,303,444 B2* | 4/2022 | Atmopawiro | H04L 9/12 |
| 11,334,872 B2 | 5/2022 | Phillips | |
| 11,361,173 B2 | 6/2022 | Edwards | |
| 11,363,318 B2* | 6/2022 | Ansari | B05D 3/002 |
| 11,388,057 B1* | 7/2022 | Balar | H04L 41/0869 |
| 11,392,933 B2 | 7/2022 | Mossler | |
| 11,392,935 B2 | 7/2022 | Suresh | |
| 11,416,844 B1 | 8/2022 | Osterkamp | |
| 11,423,392 B1 | 8/2022 | Ho | |
| 11,443,292 B2 | 9/2022 | Sherif | |
| 11,444,770 B2 | 9/2022 | Wieker | |
| 11,444,788 B2* | 9/2022 | Uy | H04L 41/0253 |
| 11,451,515 B2* | 9/2022 | Boding | G06Q 20/4016 |
| 11,461,764 B2 | 10/2022 | Rule | |
| 11,481,764 B2 | 10/2022 | Shakkarwar | |
| 11,521,145 B2* | 12/2022 | Megannon | G06Q 10/0633 |
| 11,521,213 B2 | 12/2022 | Rule | |
| 11,551,200 B1 | 1/2023 | Cook | |
| 11,556,918 B2 | 1/2023 | Mestre | |
| 11,601,807 B2* | 3/2023 | Masure | H04L 63/18 |
| 11,606,193 B2* | 3/2023 | Fan | H04L 9/0643 |
| 11,614,986 B2* | 3/2023 | Guo | G06F 11/108 714/42 |
| 11,615,395 B2 | 3/2023 | McHugh | |
| 11,657,691 B2* | 5/2023 | Chen | H05B 47/11 315/154 |
| 11,700,261 B1* | 7/2023 | Adam | H04L 63/102 726/28 |
| 11,741,214 B2* | 8/2023 | Klapman | H04L 9/0819 726/18 |
| 11,777,933 B2 | 10/2023 | Moreton | |
| 11,937,193 B2* | 3/2024 | Rico Alvarino | H04W 56/0005 |
| 12,010,222 B2* | 6/2024 | Chen | H04B 10/70 |
| 12,042,324 B2* | 7/2024 | Sun | A61B 6/547 |
| 2001/0010723 A1 | 8/2001 | Pinkas | |
| 2001/0016943 A1* | 8/2001 | Maas | H04N 5/147 386/E5.052 |
| 2001/0029485 A1 | 10/2001 | Brody et al. | |
| 2001/0033568 A1* | 10/2001 | Spooner | G06F 13/4018 370/429 |
| 2001/0033607 A1* | 10/2001 | Fleming | H04B 1/707 375/150 |
| 2001/0034702 A1 | 10/2001 | Mockett et al. | |
| 2001/0044840 A1* | 11/2001 | Carleton | H04L 41/0663 709/223 |
| 2001/0053174 A1* | 12/2001 | Fleming | G01S 5/0072 375/130 |
| 2001/0054003 A1 | 12/2001 | Chien et al. | |
| 2002/0001307 A1* | 1/2002 | Nguyen | H04L 41/0856 370/386 |
| 2002/0014533 A1* | 2/2002 | Zhu | G06K 7/10693 235/472.01 |
| 2002/0015403 A1* | 2/2002 | McConnell | H04L 12/14 370/352 |
| 2002/0049883 A1* | 4/2002 | Schneider | G06F 12/08 711/100 |
| 2002/0057018 A1* | 5/2002 | Branscomb | H04L 63/105 307/42 |
| 2002/0063622 A1* | 5/2002 | Armstrong | G06K 7/10039 340/10.2 |
| 2002/0078345 A1 | 6/2002 | Sandhu et al. | |
| 2002/0087232 A1* | 7/2002 | Lapham | B25J 9/1697 700/245 |
| 2002/0093530 A1 | 7/2002 | Krothapalli et al. | |
| 2002/0095573 A1* | 7/2002 | O'Brien | H04L 63/108 713/168 |
| 2002/0100808 A1 | 8/2002 | Norwood et al. | |
| 2002/0116485 A1* | 8/2002 | Black | H04L 41/344 709/227 |
| 2002/0120583 A1 | 8/2002 | Keresman, III et al. | |
| 2002/0152116 A1 | 10/2002 | Yan et al. | |
| 2002/0153424 A1 | 10/2002 | Li | |
| 2002/0153880 A1* | 10/2002 | Slates | G01D 5/202 324/207.16 |
| 2002/0165827 A1 | 11/2002 | Gien et al. | |
| 2002/0188713 A1* | 12/2002 | Bloch | H04Q 3/5455 709/230 |
| 2003/0014379 A1* | 1/2003 | Saias | G06Q 10/06 706/45 |
| 2003/0016166 A1* | 1/2003 | Jandrell | G01S 19/235 342/357.64 |
| 2003/0023554 A1 | 1/2003 | Yap et al. | |
| 2003/0034873 A1 | 2/2003 | Chase et al. | |
| 2003/0036425 A1* | 2/2003 | Kaminkow | G06Q 20/3433 463/25 |
| 2003/0055727 A1 | 3/2003 | Walker et al. | |
| 2003/0055928 A1 | 3/2003 | Machida | |
| 2003/0056092 A1* | 3/2003 | Edgett | H04L 63/083 713/153 |
| 2003/0056096 A1* | 3/2003 | Albert | H04L 63/108 713/168 |
| 2003/0064807 A1* | 4/2003 | Walker | G07F 17/3234 463/42 |
| 2003/0065919 A1* | 4/2003 | Albert | G06F 21/31 713/168 |
| 2003/0066340 A1* | 4/2003 | Hassenflug | G01F 1/28 73/46 |
| 2003/0078882 A1 | 4/2003 | Sukeda et al. | |
| 2003/0115371 A1 | 6/2003 | Kang et al. | |
| 2003/0126195 A1* | 7/2003 | Reynolds | H04L 63/12 714/E11.008 |
| 2003/0149581 A1* | 8/2003 | Chaudhri | G06Q 30/06 705/26.1 |
| 2003/0165088 A1* | 9/2003 | Turner | G11B 7/0948 369/53.37 |
| 2003/0167350 A1 | 9/2003 | Davis et al. | |
| 2003/0204575 A1 | 10/2003 | Master et al. | |
| 2003/0208449 A1 | 11/2003 | Diao | |

(56) References Cited

U.S. PATENT DOCUMENTS

| | | | |
|---|---|---|---|
| 2003/0216969 A1* | 11/2003 | Bauer | G06K 17/00 705/22 |
| 2003/0220876 A1 | 11/2003 | Burger et al. | |
| 2003/0221127 A1* | 11/2003 | Risan | H04L 67/568 725/25 |
| 2003/0225707 A1* | 12/2003 | Ehrman | H04L 9/40 705/64 |
| 2004/0015958 A1 | 1/2004 | Veil et al. | |
| 2004/0028123 A1* | 2/2004 | Sugar | H04L 1/1664 375/224 |
| 2004/0031030 A1* | 2/2004 | Kidder | H04L 41/22 717/172 |
| 2004/0039919 A1 | 2/2004 | Takayama et al. | |
| 2004/0078341 A1* | 4/2004 | Steichen | G06Q 20/382 705/64 |
| 2004/0078591 A1* | 4/2004 | Teixeira | H04L 63/0227 709/225 |
| 2004/0127256 A1 | 7/2004 | Goldthwaite et al. | |
| 2004/0130446 A1* | 7/2004 | Chen | G08B 25/016 340/539.12 |
| 2004/0133647 A1* | 7/2004 | Ozkan | G06Q 10/107 709/204 |
| 2004/0139336 A1* | 7/2004 | McLean | H04L 9/12 713/189 |
| 2004/0162103 A1 | 8/2004 | Montes | |
| 2004/0215674 A1 | 10/2004 | Odinak et al. | |
| 2004/0216039 A1* | 10/2004 | Lane | G06Q 10/10 715/229 |
| 2004/0230799 A1 | 11/2004 | Davis | |
| 2004/0252421 A1* | 12/2004 | Knox, Jr. | H01R 9/2641 361/23 |
| 2005/0021600 A1 | 1/2005 | Lagosanto et al. | |
| 2005/0044367 A1 | 2/2005 | Gasparini et al. | |
| 2005/0048959 A1 | 3/2005 | Schmitt | |
| 2005/0075985 A1 | 4/2005 | Cartmell | |
| 2005/0081038 A1 | 4/2005 | Arditti Modiano et al. | |
| 2005/0081139 A1* | 4/2005 | Witwer | G06F 16/35 707/E17.093 |
| 2005/0091338 A1* | 4/2005 | de la Huerga | G07C 9/28 709/217 |
| 2005/0138387 A1 | 6/2005 | Lam et al. | |
| 2005/0139363 A1* | 6/2005 | Thomas | A62C 3/025 169/72 |
| 2005/0144044 A1* | 6/2005 | Godschall | G16H 10/60 705/3 |
| 2005/0156026 A1 | 7/2005 | Ghosh et al. | |
| 2005/0160049 A1 | 7/2005 | Lundholm | |
| 2005/0165995 A1* | 7/2005 | Gemelli | G06F 30/30 710/305 |
| 2005/0186920 A1* | 8/2005 | Staszewski | H03L 7/16 455/302 |
| 2005/0187934 A1* | 8/2005 | Motsinger | H04L 63/1416 707/999.009 |
| 2005/0195975 A1 | 9/2005 | Kawakita | |
| 2005/0198247 A1* | 9/2005 | Perry | H04L 9/40 709/223 |
| 2005/0228997 A1 | 10/2005 | Bicker | |
| 2005/0240756 A1* | 10/2005 | Mayer | G06F 9/4418 713/2 |
| 2005/0246274 A1* | 11/2005 | Abbott | G06Q 40/12 705/40 |
| 2005/0247797 A1 | 11/2005 | Ramachandran | |
| 2005/0252433 A1* | 11/2005 | Gai | B63H 25/02 114/144 R |
| 2005/0254553 A1* | 11/2005 | Yao | H04B 1/71632 375/130 |
| 2005/0269402 A1 | 12/2005 | Spitzer et al. | |
| 2006/0006230 A1 | 1/2006 | Bear et al. | |
| 2006/0015725 A1* | 1/2006 | Voice | H04L 9/3273 713/168 |
| 2006/0040726 A1 | 2/2006 | Szrek et al. | |
| 2006/0041402 A1 | 2/2006 | Baker | |
| 2006/0044153 A1 | 3/2006 | Dawidowsky | |
| 2006/0047954 A1 | 3/2006 | Sachdeva et al. | |
| 2006/0062363 A1* | 3/2006 | Albrett | H04N 21/4532 348/E7.071 |
| 2006/0069890 A1* | 3/2006 | Cox | G06F 16/273 711/162 |
| 2006/0069893 A1* | 3/2006 | LeCrone | G06F 11/2058 711/167 |
| 2006/0085408 A1* | 4/2006 | Morsa | G06Q 30/0256 |
| 2006/0085848 A1 | 4/2006 | Aissi et al. | |
| 2006/0098795 A1* | 5/2006 | Choti | H04L 63/10 379/114.14 |
| 2006/0129838 A1* | 6/2006 | Chen | G06F 21/34 713/186 |
| 2006/0136334 A1 | 6/2006 | Atkinson et al. | |
| 2006/0151604 A1* | 7/2006 | Zhu | G06K 7/14 235/454 |
| 2006/0173985 A1 | 8/2006 | Moore | |
| 2006/0174331 A1 | 8/2006 | Schuetz | |
| 2006/0183980 A1* | 8/2006 | Yang | G16H 20/60 128/920 |
| 2006/0206565 A1* | 9/2006 | Ganesan | H04N 21/8456 709/204 |
| 2006/0206889 A1* | 9/2006 | Ganesan | H04N 21/4331 717/169 |
| 2006/0215022 A1* | 9/2006 | Damabhorn | G08B 13/19695 348/E7.086 |
| 2006/0218217 A1* | 9/2006 | Ganesan | H04L 67/06 709/200 |
| 2006/0242698 A1 | 10/2006 | Inskeep et al. | |
| 2006/0280338 A1 | 12/2006 | Rabb | |
| 2006/0282660 A1* | 12/2006 | Varghese | G07F 7/1083 713/155 |
| 2007/0025347 A1* | 2/2007 | Cohen | H04L 67/025 370/389 |
| 2007/0033248 A1 | 2/2007 | Prevost | |
| 2007/0033291 A1 | 2/2007 | Prevost | |
| 2007/0033642 A1 | 2/2007 | Ganesan et al. | |
| 2007/0044155 A1* | 2/2007 | Pletka | H04L 63/08 726/25 |
| 2007/0050632 A1* | 3/2007 | Matsuoka | G06F 21/88 713/182 |
| 2007/0055630 A1 | 3/2007 | Gauthier et al. | |
| 2007/0060141 A1* | 3/2007 | Kangude | H04W 74/04 455/445 |
| 2007/0061266 A1 | 3/2007 | Moore et al. | |
| 2007/0061487 A1 | 3/2007 | Moore et al. | |
| 2007/0084286 A1* | 4/2007 | Ajay | G01N 1/2205 73/597 |
| 2007/0101152 A1 | 5/2007 | Mercredi et al. | |
| 2007/0116292 A1 | 5/2007 | Kurita et al. | |
| 2007/0118745 A1 | 5/2007 | Buer | |
| 2007/0121596 A1* | 5/2007 | Kurapati | H04M 3/436 370/356 |
| 2007/0128899 A1* | 6/2007 | Mayer | G06F 9/4406 439/152 |
| 2007/0150723 A1* | 6/2007 | Estable | H04W 12/06 713/155 |
| 2007/0172066 A1* | 7/2007 | Davin | H04L 9/0869 380/262 |
| 2007/0174614 A1* | 7/2007 | Duane | H04L 9/0869 713/168 |
| 2007/0180497 A1* | 8/2007 | Popescu | H04L 63/06 726/4 |
| 2007/0197261 A1 | 8/2007 | Humbel | |
| 2007/0224969 A1 | 9/2007 | Rao | |
| 2007/0236453 A1* | 10/2007 | Maynard | G06F 40/194 345/158 |
| 2007/0241182 A1 | 10/2007 | Buer | |
| 2007/0250923 A1 | 10/2007 | M'Raihi | |
| 2007/0256134 A1 | 11/2007 | Lehtonen et al. | |
| 2007/0258594 A1 | 11/2007 | Sandhu et al. | |
| 2007/0276765 A1 | 11/2007 | Hazel et al. | |
| 2007/0278291 A1 | 12/2007 | Rans et al. | |
| 2008/0008315 A1 | 1/2008 | Fontana et al. | |
| 2008/0010189 A1* | 1/2008 | Rosenberger | G06Q 40/02 705/39 |
| 2008/0011831 A1 | 1/2008 | Bonalle et al. | |

(56) References Cited

U.S. PATENT DOCUMENTS

| | | |
|---|---|---|
| 2008/0014867 A1 | 1/2008 | Finn |
| 2008/0029607 A1* | 2/2008 | Mullen .................. G06Q 20/24 |
| | | 235/492 |
| 2008/0035738 A1 | 2/2008 | Mullen |
| 2008/0040364 A1* | 2/2008 | Li .......................... G06Q 10/10 |
| 2008/0056501 A1* | 3/2008 | McGough ............... H04L 63/08 |
| | | 380/282 |
| 2008/0071681 A1 | 3/2008 | Khalid |
| 2008/0072303 A1 | 3/2008 | Syed |
| 2008/0082452 A1 | 4/2008 | Wankmueller et al. |
| 2008/0086767 A1 | 4/2008 | Kulkarni et al. |
| 2008/0099552 A1 | 5/2008 | Grillion |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0134165 A1* | 6/2008 | Anderson .......... H04N 21/4586 |
| | | 717/173 |
| 2008/0156873 A1 | 7/2008 | Wilhelm et al. |
| 2008/0162312 A1 | 7/2008 | Sklovsky et al. |
| 2008/0162844 A1* | 7/2008 | Yoder ..................... H04L 69/40 |
| | | 711/E12.103 |
| 2008/0162845 A1* | 7/2008 | Cox .................... G06F 11/2069 |
| | | 711/E12.103 |
| 2008/0164308 A1 | 7/2008 | Aaron et al. |
| 2008/0177994 A1* | 7/2008 | Mayer ..................... G06F 16/00 |
| | | 709/224 |
| 2008/0189365 A1* | 8/2008 | Narayanaswami ... H04L 67/142 |
| | | 709/204 |
| 2008/0194295 A1 | 8/2008 | Pua |
| 2008/0207307 A1 | 8/2008 | Cunningham Ii et al. |
| 2008/0209543 A1 | 8/2008 | Aaron |
| 2008/0212493 A1* | 9/2008 | Lenz ................. H04L 12/40013 |
| | | 370/254 |
| 2008/0218373 A1* | 9/2008 | Lanigan ............. G07C 9/00182 |
| | | 340/5.1 |
| 2008/0223918 A1 | 9/2008 | Williams et al. |
| 2008/0244702 A1* | 10/2008 | Kropivny ............ H04L 12/1822 |
| | | 726/3 |
| 2008/0258882 A1* | 10/2008 | Lester ................. H04B 14/026 |
| | | 375/259 |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0077645 A1* | 3/2009 | Kottahachchi .......... G06F 21/33 |
| | | 726/9 |
| 2009/0106353 A1* | 4/2009 | Belovich .............. H04L 63/101 |
| | | 709/203 |
| 2009/0119631 A1* | 5/2009 | Cortadella ............. H03K 19/20 |
| | | 716/113 |
| 2009/0132417 A1 | 5/2009 | Scipioni et al. |
| 2009/0141689 A1* | 6/2009 | Parekh .............. H04W 36/0085 |
| | | 370/332 |
| 2009/0143104 A1 | 6/2009 | Loh et al. |
| 2009/0149202 A1* | 6/2009 | Hill ........................ G01S 5/0289 |
| | | 342/357.22 |
| 2009/0152391 A1* | 6/2009 | McWhirk ................. B64B 1/70 |
| | | 244/30 |
| 2009/0171682 A1 | 7/2009 | Dixon et al. |
| 2009/0173782 A1* | 7/2009 | Muscato ........... G06Q 20/40975 |
| | | 235/379 |
| 2009/0210308 A1 | 8/2009 | Toomer et al. |
| 2009/0217035 A1* | 8/2009 | Abdul Hameed Khan ................. G07F 7/1008 |
| | | 713/168 |
| 2009/0235339 A1 | 9/2009 | Mennes et al. |
| 2009/0240565 A1* | 9/2009 | Calonge ................... G06Q 30/04 |
| | | 705/40 |
| 2009/0249077 A1 | 10/2009 | Gargaro et al. |
| 2009/0249460 A1* | 10/2009 | Fitzgerald ............... H04L 63/12 |
| | | 709/206 |
| 2009/0271412 A1* | 10/2009 | Lacapra ................. G06F 16/178 |
| 2009/0282264 A1 | 11/2009 | Amiel et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0080163 A1* | 4/2010 | Krishnamoorthi .... H04W 4/029 |
| | | 340/568.1 |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0162260 A1* | 6/2010 | Ibrahim .................. H04L 63/10 |
| | | 719/315 |
| 2010/0164753 A1* | 7/2010 | Free ................... G08G 1/09675 |
| | | 340/932 |
| 2010/0180260 A1* | 7/2010 | Chikkadevaiah ... G06F 11/3664 |
| | | 717/125 |
| 2010/0192230 A1 | 7/2010 | Steeves et al. |
| 2010/0198728 A1* | 8/2010 | Aabye ..................... G06Q 20/40 |
| | | 726/19 |
| 2010/0207742 A1 | 8/2010 | Buhot et al. |
| 2010/0210206 A1* | 8/2010 | Young ..................... G01S 19/37 |
| | | 455/13.4 |
| 2010/0211797 A1 | 8/2010 | Westerveld et al. |
| 2010/0240413 A1 | 9/2010 | He et al. |
| 2010/0250357 A1* | 9/2010 | Kim .................... G06Q 30/0277 |
| | | 707/723 |
| 2010/0257357 A1 | 10/2010 | McClain |
| 2010/0257507 A1* | 10/2010 | Warren ..................... G06F 8/40 |
| | | 345/619 |
| 2010/0312634 A1 | 12/2010 | Cervenka |
| 2010/0312635 A1 | 12/2010 | Cervenka |
| 2010/0313056 A1 | 12/2010 | Margolis et al. |
| 2010/0317401 A1* | 12/2010 | Lee ........................ G06F 16/27 |
| | | 717/173 |
| 2011/0000960 A1* | 1/2011 | Harris .............. G06K 19/07733 |
| | | 235/380 |
| 2011/0028160 A1 | 2/2011 | Roeding et al. |
| 2011/0035604 A1 | 2/2011 | Habraken |
| 2011/0058036 A1* | 3/2011 | Metzger ................... H04N 7/181 |
| | | 348/143 |
| 2011/0060631 A1 | 3/2011 | Grossman et al. |
| 2011/0063094 A1* | 3/2011 | Meiertoberens .. A61M 5/14244 |
| | | 340/12.5 |
| 2011/0065421 A1* | 3/2011 | Gluck ..................... G06Q 30/02 |
| | | 455/414.1 |
| 2011/0068170 A1 | 3/2011 | Lehman |
| 2011/0074552 A1* | 3/2011 | Norair ................ H04W 52/0216 |
| | | 340/10.1 |
| 2011/0078245 A1 | 3/2011 | Kiffer |
| 2011/0084132 A1 | 4/2011 | Tofighbakhsh |
| 2011/0099489 A1* | 4/2011 | Glenn .................... G06Q 30/018 |
| | | 715/764 |
| 2011/0101093 A1 | 5/2011 | Ehrensvard |
| 2011/0113245 A1 | 5/2011 | Varadrajan |
| 2011/0125593 A1* | 5/2011 | Wright ................. G06Q 30/0641 |
| | | 709/224 |
| 2011/0125602 A1 | 5/2011 | Kamada |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0155801 A1 | 6/2011 | Rowberry |
| 2011/0170532 A1* | 7/2011 | Tchepnda ............... H04W 12/06 |
| | | 370/338 |
| 2011/0184644 A1* | 7/2011 | McBurney .............. G01S 19/47 |
| | | 701/532 |
| 2011/0208424 A1* | 8/2011 | Hirsch .................. G01C 21/165 |
| | | 701/532 |
| 2011/0208658 A1 | 8/2011 | Makhotin |
| 2011/0208965 A1 | 8/2011 | Machani |
| 2011/0211219 A1 | 9/2011 | Bradley |
| 2011/0216953 A1* | 9/2011 | Callahan ................... C12Q 3/00 |
| | | 382/128 |

(56) References Cited

U.S. PATENT DOCUMENTS

| | | |
|---|---|---|
| 2011/0218911 A1 | 9/2011 | Spodak |
| 2011/0219035 A1* | 9/2011 | Korsunsky ............ H04L 63/102 707/E17.005 |
| 2011/0219208 A1* | 9/2011 | Asaad ..................... G06F 9/06 712/12 |
| 2011/0238564 A1 | 9/2011 | Lim et al. |
| 2011/0246780 A1 | 10/2011 | Yeap et al. |
| 2011/0248846 A1* | 10/2011 | Belov ............... G01N 33/0075 340/539.1 |
| 2011/0257882 A1* | 10/2011 | McBurney ............. G01S 19/47 701/532 |
| 2011/0258452 A1 | 10/2011 | Coulier et al. |
| 2011/0261805 A1* | 10/2011 | Landry .................. G01S 19/31 375/E1.003 |
| 2011/0280406 A1 | 11/2011 | Ma et al. |
| 2011/0282785 A1 | 11/2011 | Chin |
| 2011/0290899 A1* | 12/2011 | Petrovich ............... A01G 15/00 239/14.1 |
| 2011/0294418 A1 | 12/2011 | Chen |
| 2011/0297740 A1 | 12/2011 | Raffard et al. |
| 2011/0307945 A1* | 12/2011 | Huang ................... G06F 21/74 726/6 |
| 2011/0312271 A1 | 12/2011 | Ma et al. |
| 2012/0009890 A1* | 1/2012 | Curcio ................. H04W 4/029 455/230 |
| 2012/0023059 A1* | 1/2012 | Morgan ............. H04L 27/2676 341/155 |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0089835 A1* | 4/2012 | Peckover ................ G06F 21/78 713/168 |
| 2012/0109735 A1 | 5/2012 | Krawczewicz et al. |
| 2012/0109764 A1 | 5/2012 | Martin et al. |
| 2012/0143703 A1 | 6/2012 | Wall |
| 2012/0143754 A1 | 6/2012 | Patel |
| 2012/0150737 A1 | 6/2012 | Rottink |
| 2012/0158362 A1* | 6/2012 | Vandevelde ....... H01L 31/02021 702/183 |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0004987 A1* | 1/2013 | Lo ..................... B01L 3/502707 356/338 |
| 2013/0005245 A1 | 1/2013 | Royston |
| 2013/0008956 A1 | 1/2013 | Ashfield |
| 2013/0012185 A1 | 1/2013 | Lavi et al. |
| 2013/0023240 A1* | 1/2013 | Weiner ................ G06Q 20/4015 455/411 |
| 2013/0026229 A1 | 1/2013 | Jarman et al. |
| 2013/0030997 A1 | 1/2013 | Spodak et al. |
| 2013/0048713 A1 | 2/2013 | Pan |
| 2013/0054474 A1 | 2/2013 | Yeager |
| 2013/0054967 A1* | 2/2013 | Davoust .................. H04L 63/06 713/168 |
| 2013/0058274 A1* | 3/2013 | Scherzer ................ H04W 12/08 370/328 |
| 2013/0065564 A1 | 3/2013 | Conner et al. |
| 2013/0080228 A1 | 3/2013 | Fisher |
| 2013/0080229 A1 | 3/2013 | Fisher |
| 2013/0085815 A1* | 4/2013 | Onischuk ............... G07C 13/00 235/386 |
| 2013/0099587 A1 | 4/2013 | Lou |
| 2013/0104251 A1 | 4/2013 | Moore et al. |
| 2013/0106576 A1 | 5/2013 | Hinman et al. |
| 2013/0117462 A1* | 5/2013 | Ganesan ............ H04N 21/4331 709/231 |
| 2013/0119130 A1 | 5/2013 | Braams |
| 2013/0130614 A1 | 5/2013 | Busch-Sorensen |
| 2013/0144793 A1 | 6/2013 | Royston |
| 2013/0146657 A1 | 6/2013 | Graef et al. |
| 2013/0159449 A1* | 6/2013 | Taylor ..................... G06F 9/54 709/212 |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0185774 A1* | 7/2013 | Morelli, Jr. ........... H04L 63/105 726/4 |
| 2013/0191279 A1 | 7/2013 | Calman et al. |
| 2013/0198819 A1* | 8/2013 | Gordon ................... G06F 21/45 726/5 |
| 2013/0200999 A1 | 8/2013 | Spodak et al. |
| 2013/0211937 A1 | 8/2013 | Elbirt |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0229955 A1* | 9/2013 | Xu ....................... H04W 52/143 370/280 |
| 2013/0232082 A1 | 9/2013 | Krawczewicz et al. |
| 2013/0238894 A1 | 9/2013 | Ferg et al. |
| 2013/0244744 A1* | 9/2013 | Fonss ........................ A63F 9/24 463/16 |
| 2013/0259232 A1* | 10/2013 | Petel ..................... H04W 12/06 455/411 |
| 2013/0282360 A1 | 10/2013 | Shimota et al. |
| 2013/0297503 A1* | 11/2013 | McGowan ............. G06Q 20/34 705/41 |
| 2013/0303085 A1 | 11/2013 | Boucher et al. |
| 2013/0304651 A1 | 11/2013 | Smith |
| 2013/0311363 A1 | 11/2013 | Ramaci |
| 2013/0312082 A1 | 11/2013 | Izu et al. |
| 2013/0314593 A1 | 11/2013 | Reznik et al. |
| 2013/0343540 A1* | 12/2013 | Sarkkinen ........... H04L 12/1859 380/255 |
| 2013/0344857 A1 | 12/2013 | Berionne et al. |
| 2013/0346628 A1* | 12/2013 | Canion ................. H04L 63/101 709/245 |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074315 A1* | 3/2014 | Frye ........................ G08G 1/01 701/1 |
| 2014/0074637 A1 | 3/2014 | Hammad |
| 2014/0074655 A1 | 3/2014 | Lim et al. |
| 2014/0081720 A1 | 3/2014 | Wu |
| 2014/0081785 A1 | 3/2014 | Valadas Preto |
| 2014/0108789 A1* | 4/2014 | Phatak ................ H04L 63/0823 713/168 |
| 2014/0128032 A1* | 5/2014 | Muthukumar .... H04W 52/0254 455/412.2 |
| 2014/0138435 A1 | 5/2014 | Khalid |
| 2014/0165189 A1* | 6/2014 | Foley ..................... H04L 63/20 726/22 |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |

(56) References Cited

U.S. PATENT DOCUMENTS

| | | | |
|---|---|---|---|
| 2014/0231512 A1* | 8/2014 | Onischuk | G07C 13/00 235/386 |
| 2014/0236953 A1* | 8/2014 | Rapaport | G06F 16/285 707/740 |
| 2014/0245391 A1 | 8/2014 | Adenuga | |
| 2014/0256251 A1 | 9/2014 | Caceres et al. | |
| 2014/0258099 A1 | 9/2014 | Rosano | |
| 2014/0258113 A1 | 9/2014 | Gauthier et al. | |
| 2014/0258125 A1 | 9/2014 | Gerber et al. | |
| 2014/0274179 A1 | 9/2014 | Zhu et al. | |
| 2014/0279479 A1 | 9/2014 | Maniar et al. | |
| 2014/0304393 A1* | 10/2014 | Annamalaisami | G06F 11/3495 709/224 |
| 2014/0304798 A1* | 10/2014 | Iyengar | H04L 63/1458 726/11 |
| 2014/0337235 A1 | 11/2014 | Van Heerden et al. | |
| 2014/0339315 A1 | 11/2014 | Ko | |
| 2014/0346860 A1 | 11/2014 | Aubry et al. | |
| 2014/0365281 A1* | 12/2014 | Onischuk | G07C 13/00 705/12 |
| 2014/0365377 A1 | 12/2014 | Salama et al. | |
| 2014/0365780 A1 | 12/2014 | Movassaghi | |
| 2014/0379361 A1 | 12/2014 | Mahadkar et al. | |
| 2015/0012444 A1 | 1/2015 | Brown et al. | |
| 2015/0032635 A1 | 1/2015 | Guise | |
| 2015/0058947 A1* | 2/2015 | John | H04W 12/06 726/7 |
| 2015/0067794 A1 | 3/2015 | Blakely | |
| 2015/0071486 A1 | 3/2015 | Rhoads et al. | |
| 2015/0073983 A1 | 3/2015 | Bartenstein et al. | |
| 2015/0088757 A1 | 3/2015 | Zhou et al. | |
| 2015/0089586 A1 | 3/2015 | Ballesteros | |
| 2015/0095047 A1* | 4/2015 | Burrows | A61J 7/0436 206/534 |
| 2015/0100497 A1* | 4/2015 | de Jong | G06Q 20/3829 705/71 |
| 2015/0113271 A1 | 4/2015 | Jooste et al. | |
| 2015/0134452 A1 | 5/2015 | Williams | |
| 2015/0134513 A1 | 5/2015 | Olson et al. | |
| 2015/0134540 A1 | 5/2015 | Law et al. | |
| 2015/0140960 A1 | 5/2015 | Powell et al. | |
| 2015/0154595 A1 | 6/2015 | Collinge et al. | |
| 2015/0163206 A1* | 6/2015 | McCarthy | G06F 21/6227 726/4 |
| 2015/0170138 A1 | 6/2015 | Rao | |
| 2015/0178724 A1 | 6/2015 | Ngo et al. | |
| 2015/0186871 A1 | 7/2015 | Laracey | |
| 2015/0188891 A1* | 7/2015 | Grange | H04L 63/0838 380/270 |
| 2015/0199673 A1 | 7/2015 | Savolainen | |
| 2015/0199863 A1 | 7/2015 | Scoggins et al. | |
| 2015/0205379 A1 | 7/2015 | Mag et al. | |
| 2015/0207628 A1* | 7/2015 | Hilla | G06F 11/079 713/193 |
| 2015/0212833 A1 | 7/2015 | Wang et al. | |
| 2015/0229475 A1* | 8/2015 | Benoit | H04W 12/069 713/168 |
| 2015/0254637 A1 | 9/2015 | Yang | |
| 2015/0302409 A1 | 10/2015 | Malek | |
| 2015/0310188 A1* | 10/2015 | Ford | H04L 63/101 726/28 |
| 2015/0317295 A1 | 11/2015 | Sherry et al. | |
| 2015/0317626 A1 | 11/2015 | Ran et al. | |
| 2015/0332266 A1 | 11/2015 | Friedlander et al. | |
| 2015/0339474 A1 | 11/2015 | Paz et al. | |
| 2015/0348026 A1 | 12/2015 | Roberts et al. | |
| 2015/0348029 A1* | 12/2015 | Van Os | G06Q 20/401 705/44 |
| 2015/0371234 A1 | 12/2015 | Huang et al. | |
| 2015/0371457 A1* | 12/2015 | Bakfan | G07C 5/0841 701/29.3 |
| 2016/0012465 A1 | 1/2016 | Sharp | |
| 2016/0018253 A1* | 1/2016 | O'Neil | G01G 19/4144 177/25.13 |
| 2016/0026997 A1 | 1/2016 | Tsui et al. | |
| 2016/0044036 A1* | 2/2016 | Bestermann | H04L 63/101 726/4 |
| 2016/0048913 A1 | 2/2016 | Rausaria et al. | |
| 2016/0055480 A1 | 2/2016 | Shah | |
| 2016/0057619 A1 | 2/2016 | Lopez | |
| 2016/0061625 A1* | 3/2016 | Wang | G01C 21/3697 701/454 |
| 2016/0065370 A1 | 3/2016 | Le Saint et al. | |
| 2016/0065576 A1* | 3/2016 | Zhang | H04L 63/10 726/3 |
| 2016/0078430 A1 | 3/2016 | Douglas | |
| 2016/0080413 A1* | 3/2016 | Smith | H04L 63/1458 726/23 |
| 2016/0087957 A1 | 3/2016 | Shah et al. | |
| 2016/0092696 A1 | 3/2016 | Guglani et al. | |
| 2016/0094990 A1* | 3/2016 | Witherspoon | H04W 12/50 713/171 |
| 2016/0105411 A1* | 4/2016 | Vallieres | H04L 67/01 726/3 |
| 2016/0135024 A1* | 5/2016 | Väisänen | H04W 76/38 455/414.1 |
| 2016/0148193 A1 | 5/2016 | Kelley et al. | |
| 2016/0173498 A1* | 6/2016 | Liu | H04W 12/06 726/6 |
| 2016/0189143 A1 | 6/2016 | Koeppel | |
| 2016/0224779 A1* | 8/2016 | Kitane | H04L 63/0861 |
| 2016/0232523 A1 | 8/2016 | Venot et al. | |
| 2016/0239672 A1 | 8/2016 | Khan et al. | |
| 2016/0253651 A1 | 9/2016 | Park et al. | |
| 2016/0255072 A1 | 9/2016 | Liu | |
| 2016/0267486 A1 | 9/2016 | Mitra et al. | |
| 2016/0272467 A1* | 9/2016 | Ghadamossoltani | G08G 1/052 |
| 2016/0277374 A1* | 9/2016 | Reid | H04L 63/0435 |
| 2016/0277383 A1 | 9/2016 | Guyomarc'h et al. | |
| 2016/0277388 A1 | 9/2016 | Lowe et al. | |
| 2016/0285947 A1* | 9/2016 | Saxena | H04L 63/10 |
| 2016/0301229 A1* | 10/2016 | Chao | H04N 21/41407 |
| 2016/0307187 A1 | 10/2016 | Guo et al. | |
| 2016/0307189 A1 | 10/2016 | Zarakas et al. | |
| 2016/0314472 A1 | 10/2016 | Ashfield | |
| 2016/0314492 A1* | 10/2016 | Ford | G06Q 30/02 |
| 2016/0330027 A1 | 11/2016 | Ebrahimi | |
| 2016/0330219 A1* | 11/2016 | Hasan | H04L 63/1408 |
| 2016/0335531 A1 | 11/2016 | Mullen et al. | |
| 2016/0379217 A1 | 12/2016 | Hammad | |
| 2017/0004502 A1 | 1/2017 | Quentin et al. | |
| 2017/0005515 A1* | 1/2017 | Sanders | H02J 3/388 |
| 2017/0011395 A1 | 1/2017 | Pillai et al. | |
| 2017/0011406 A1 | 1/2017 | Tunnell et al. | |
| 2017/0017957 A1 | 1/2017 | Radu | |
| 2017/0017964 A1 | 1/2017 | Janefalkar et al. | |
| 2017/0024716 A1 | 1/2017 | Jiam et al. | |
| 2017/0039566 A1 | 2/2017 | Schipperheijn | |
| 2017/0041296 A1* | 2/2017 | Ford | G06F 21/64 |
| 2017/0041759 A1 | 2/2017 | Gantert et al. | |
| 2017/0041794 A1* | 2/2017 | Lee | H04W 12/06 |
| 2017/0054547 A1* | 2/2017 | Nishimoto | H04L 12/40 |
| 2017/0068950 A1 | 3/2017 | Kwon | |
| 2017/0071017 A1* | 3/2017 | Klemans | H04W 4/80 |
| 2017/0095667 A1* | 4/2017 | Yakovlev | A61B 5/0022 |
| 2017/0103388 A1 | 4/2017 | Pillai et al. | |
| 2017/0104739 A1 | 4/2017 | Lansler et al. | |
| 2017/0109509 A1 | 4/2017 | Baghdasaryan | |
| 2017/0109730 A1 | 4/2017 | Locke et al. | |
| 2017/0116447 A1 | 4/2017 | Cimino et al. | |
| 2017/0124568 A1 | 5/2017 | Moghadam | |
| 2017/0128769 A1* | 5/2017 | Long | A61G 10/02 |
| 2017/0134382 A1* | 5/2017 | Darnell | H04L 67/12 |
| 2017/0135609 A1* | 5/2017 | Eckblad | A61B 5/1104 |
| 2017/0140379 A1 | 5/2017 | Deck | |
| 2017/0142160 A1* | 5/2017 | Nguyen-Huu | H04L 63/10 |
| 2017/0154328 A1 | 6/2017 | Zarakas et al. | |
| 2017/0154333 A1 | 6/2017 | Gleeson et al. | |
| 2017/0161720 A1* | 6/2017 | Xing | G06Q 20/3829 |
| 2017/0171208 A1* | 6/2017 | Purushothaman | H04L 63/20 |

(56) References Cited

U.S. PATENT DOCUMENTS

| | | |
|---|---|---|
| 2017/0180134 A1 | 6/2017 | King |
| 2017/0213127 A1* | 7/2017 | Duncan .................. G16B 50/30 |
| 2017/0214701 A1* | 7/2017 | Hasan ................ H04L 63/1433 |
| 2017/0230189 A1 | 8/2017 | Toll et al. |
| 2017/0235848 A1* | 8/2017 | Van Dusen .......... G06Q 10/101 |
| | | 705/12 |
| 2017/0237301 A1 | 8/2017 | Elad et al. |
| 2017/0289127 A1 | 10/2017 | Hendrick |
| 2017/0293740 A1* | 10/2017 | Xing ................... G06Q 20/204 |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0330449 A1* | 11/2017 | Lunardhi ............... H04L 67/125 |
| 2017/0337354 A1* | 11/2017 | Drey ................... G06Q 50/184 |
| 2017/0346850 A1 | 11/2017 | Jin et al. |
| 2017/0348498 A1* | 12/2017 | Salter .................... A61M 16/16 |
| 2017/0374070 A1 | 12/2017 | Shah et al. |
| 2018/0026787 A1 | 1/2018 | Le Saint et al. |
| 2018/0034507 A1 | 2/2018 | Wobak et al. |
| 2018/0035294 A1* | 2/2018 | Reunamäki ........... H04W 12/08 |
| 2018/0039986 A1 | 2/2018 | Essebag et al. |
| 2018/0039987 A1 | 2/2018 | Molino |
| 2018/0048666 A1* | 2/2018 | Alderson ................ H04L 45/20 |
| 2018/0068316 A1 | 3/2018 | Essebag et al. |
| 2018/0089434 A1* | 3/2018 | Sibert ................ H04L 63/0853 |
| 2018/0089790 A1* | 3/2018 | Tehranchi ........... H04N 1/32288 |
| 2018/0129945 A1 | 5/2018 | Saxena et al. |
| 2018/0137486 A1* | 5/2018 | Nikkel ............... G06Q 20/1085 |
| 2018/0158036 A1* | 6/2018 | Zhou ........................ G06F 1/163 |
| 2018/0160255 A1 | 6/2018 | Park |
| 2018/0191501 A1 | 7/2018 | Lindemann |
| 2018/0197187 A1* | 7/2018 | Chung ............... G06K 7/10297 |
| 2018/0205712 A1 | 7/2018 | Versteeg et al. |
| 2018/0227126 A1* | 8/2018 | Abe ........................ H04L 63/14 |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0276666 A1* | 9/2018 | Haldenby ............. H04L 9/3268 |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0309764 A1* | 10/2018 | Kras ................... G06F 9/30029 |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0323972 A1* | 11/2018 | Reed ................... H04W 12/068 |
| 2018/0336363 A1* | 11/2018 | Algie ................. G06F 11/1088 |
| 2018/0350180 A1* | 12/2018 | Onischuk ............... G07C 13/00 |
| 2018/0357993 A1* | 12/2018 | Baker ..................... G10H 3/182 |
| 2018/0359100 A1 | 12/2018 | Gaddam et al. |
| 2018/0359196 A1* | 12/2018 | Naganathan .......... H04L 49/552 |
| 2019/0014107 A1 | 1/2019 | George |
| 2019/0019375 A1 | 1/2019 | Foley |
| 2019/0028492 A1* | 1/2019 | Coleman .............. G08B 21/182 |
| 2019/0036678 A1 | 1/2019 | Ahmed |
| 2019/0052641 A1* | 2/2019 | Byrne ................... H04L 63/104 |
| 2019/0081763 A1* | 3/2019 | Akkarakaran ........ H04L 1/0026 |
| 2019/0092280 A1* | 3/2019 | Oesterling ............... G06F 21/86 |
| 2019/0102756 A1* | 4/2019 | Zhou ................... G06Q 20/3278 |
| 2019/0109716 A1* | 4/2019 | Mizoguchi ............ H04L 9/3242 |
| 2019/0126775 A1* | 5/2019 | Han ........................ B60L 3/12 |
| 2019/0132630 A1* | 5/2019 | Loheide ........... H04N 21/23439 |
| 2019/0141041 A1* | 5/2019 | Bhabbur ................ H04L 9/3228 |
| 2019/0150177 A1* | 5/2019 | Chen ................. H04W 72/1268 |
| | | 370/329 |
| 2019/0172051 A1* | 6/2019 | Lee ..................... G06Q 20/321 |
| 2019/0172055 A1 | 6/2019 | Hale |
| 2019/0182213 A1* | 6/2019 | Saavedra ............ H04L 63/0218 |
| 2019/0236594 A1* | 8/2019 | Ehrlich-Quinn ..... G06Q 20/401 |
| 2019/0238517 A1 | 8/2019 | D'Agostino et al. |
| 2019/0261909 A1* | 8/2019 | Torres ..................... A61B 5/4082 |
| 2019/0281025 A1* | 9/2019 | Harriman ............. H04L 9/3239 |
| 2019/0303945 A1 | 10/2019 | Mitra |
| 2019/0313254 A1* | 10/2019 | Zaks .................... H04W 12/069 |
| 2019/0319843 A1* | 10/2019 | Telfer ...................... H04L 63/10 |
| 2019/0370155 A1* | 12/2019 | Nanjundappa ...... G06F 11/3608 |
| 2019/0370772 A1* | 12/2019 | Youssef ............... G06Q 20/3823 |
| 2020/0014733 A1* | 1/2020 | Vanderheeren ..... H04L 12/1818 |
| 2020/0019967 A1* | 1/2020 | Abdi Taghi Abad ........................ |
| | | G06Q 20/4012 |
| 2020/0042684 A1* | 2/2020 | Gehrmann ............ G06F 21/32 |
| 2020/0064444 A1* | 2/2020 | Regani .................... G01S 7/006 |
| 2020/0067922 A1* | 2/2020 | Avetisov .............. H04L 63/0823 |
| 2020/0068400 A1* | 2/2020 | Ramic ................. H04L 63/0876 |
| 2020/0106756 A1* | 4/2020 | Osborn ................. H04L 9/3271 |
| 2020/0121544 A1* | 4/2020 | George .................. A61H 21/00 |
| 2020/0162271 A1* | 5/2020 | Cambou .............. H04L 63/0435 |
| 2020/0162455 A1* | 5/2020 | Lin ...................... H04L 63/0853 |
| 2020/0186513 A1 | 6/2020 | Osborn et al. |
| 2020/0201636 A1* | 6/2020 | Alexander ........... G06F 13/4027 |
| 2020/0202117 A1* | 6/2020 | Wu ......................... G06F 21/32 |
| 2020/0311650 A1* | 10/2020 | Xu ..................... G06Q 30/0635 |
| 2020/0334372 A1* | 10/2020 | Kim ..................... H04L 63/102 |
| 2020/0368616 A1* | 11/2020 | Delamont ............ H04N 13/239 |
| 2020/0402423 A1* | 12/2020 | Luyckx ................. G06F 3/04895 |
| 2021/0004806 A1 | 1/2021 | Noe |
| 2021/0022009 A1* | 1/2021 | De Sousa Chaves ...................... |
| | | H04W 76/25 |
| 2021/0044976 A1* | 2/2021 | Avetisov .................. G06F 21/64 |
| 2021/0073212 A1* | 3/2021 | Conley ................. H04L 9/3213 |
| 2021/0080514 A1* | 3/2021 | Beaudet ................ G08B 17/00 |
| 2021/0116517 A1* | 4/2021 | Snook, II ............... H04L 67/535 |
| 2021/0126922 A1* | 4/2021 | Stokes ................. G06F 21/6227 |
| 2021/0132923 A1* | 5/2021 | Fang .................... G06F 9/30058 |
| 2021/0157897 A1* | 5/2021 | Le Bail ................ H04W 76/10 |
| 2021/0176285 A1* | 6/2021 | Vanderheeren ......... H04L 51/56 |
| 2021/0188252 A1* | 6/2021 | Lu ......................... B60W 40/12 |
| 2021/0192034 A1* | 6/2021 | Kanayama ............ G06F 21/35 |
| 2021/0213935 A1* | 7/2021 | Lu ........................... B60C 23/04 |
| 2021/0248601 A1* | 8/2021 | Paiva De Brito Sousa ................ |
| | | G06Q 20/24 |
| 2021/0258308 A1* | 8/2021 | Avetisov ............... H04L 9/3215 |
| 2021/0264012 A1* | 8/2021 | Mare ..................... H04W 12/06 |
| 2021/0272098 A1 | 9/2021 | Delsuc et al. |
| 2021/0273717 A1* | 9/2021 | Wigard ................. H04W 76/27 |
| 2021/0304189 A1 | 9/2021 | Gupta |
| 2021/0377294 A1* | 12/2021 | Gupta ................. H04L 63/1425 |
| 2021/0383360 A1 | 12/2021 | Sinha |
| 2021/0400083 A1* | 12/2021 | Stokes ..................... H04L 43/12 |
| 2021/0406869 A1 | 12/2021 | Pathrabe |
| 2022/0105793 A1* | 4/2022 | Sukhatankar ....... B60L 15/2054 |
| 2022/0114581 A1 | 4/2022 | Upadhye |
| 2022/0131904 A1* | 4/2022 | Wright .................. H04L 63/102 |
| 2022/0263649 A1* | 8/2022 | Kajuluri ................ H04L 7/0008 |
| 2022/0263831 A1* | 8/2022 | Hoang .................. H04L 63/101 |
| 2022/0271979 A1* | 8/2022 | Lanneer ............... H04B 10/6971 |
| 2022/0272084 A1* | 8/2022 | Hyatt .................... H04W 12/40 |
| 2022/0284416 A1 | 9/2022 | Rule |
| 2022/0286440 A1* | 9/2022 | Gerrie ..................... G06F 21/62 |
| 2022/0292543 A1* | 9/2022 | Henderson .......... G06Q 30/0252 |
| 2022/0309509 A1 | 9/2022 | Akgun |
| 2022/0319283 A1* | 10/2022 | Misra .................. G06Q 20/1085 |
| 2022/0323777 A1* | 10/2022 | Zhang .................. A61N 1/36142 |
| 2022/0335412 A1 | 10/2022 | Rule |
| 2022/0366410 A1 | 11/2022 | Rule |
| 2022/0385656 A1* | 12/2022 | Gujarathi ............. H04L 63/0876 |
| 2022/0398566 A1 | 12/2022 | Rule |
| 2022/0414648 A1 | 12/2022 | Rule |
| 2023/0007483 A1* | 1/2023 | Mueck ................. G06Q 50/265 |
| 2023/0017878 A1* | 1/2023 | Ho ........................ G06F 40/205 |
| 2023/0046788 A1* | 2/2023 | Zarakas ................ G06K 19/0772 |
| 2023/0049580 A1* | 2/2023 | Benkreira ............. G06K 7/10366 |
| 2023/0054157 A1 | 2/2023 | Mao |
| 2023/0065163 A1 | 3/2023 | Vargas |
| 2023/0076100 A1* | 3/2023 | Maleki ..................... H04L 5/0091 |
| 2023/0082668 A1* | 3/2023 | B.K. ....................... G06F 16/48 |
| | | 707/822 |
| 2023/0083785 A1 | 3/2023 | Maiman |
| 2023/0094085 A1* | 3/2023 | Kim .................... G06Q 30/0645 |
| | | 340/5.7 |
| 2023/0151725 A1* | 5/2023 | Hovda ..................... E21B 47/04 |
| | | 166/311 |

(56) References Cited

U.S. PATENT DOCUMENTS

| | | | |
|---|---|---|---|
| 2023/0169505 | A1 | 6/2023 | Rule |
| 2023/0224761 | A1* | 7/2023 | Fu .................... H04W 28/18 |
| | | | 370/328 |
| 2023/0354020 | A1 | 11/2023 | Rule |
| 2023/0359839 | A1 | 11/2023 | Lovgren |
| 2024/0014966 | A1* | 1/2024 | Abdelghaffar ...... H04W 72/231 |
| 2024/0036860 | A1* | 2/2024 | Li ............................ G06F 8/65 |
| 2024/0046034 | A1* | 2/2024 | Casadei ............... G06F 40/268 |
| 2024/0048259 | A1* | 2/2024 | Pscheidl ................ H04H 20/02 |
| 2024/0080157 | A1* | 3/2024 | Hakola ................ H04B 7/0417 |
| 2024/0080837 | A1* | 3/2024 | Xue ...................... H04L 1/0026 |
| 2024/0125851 | A1* | 4/2024 | Curewitz ....... G01R 31/318597 |
| 2024/0152704 | A1* | 5/2024 | Desai ..................... G06F 40/35 |
| 2024/0179599 | A1* | 5/2024 | Lei ........................ H04W 24/10 |
| 2024/0406209 | A1* | 12/2024 | Choi .................. H04L 63/1416 |
| 2024/0413858 | A1* | 12/2024 | Mcmenamy ....... H04B 7/04013 |

FOREIGN PATENT DOCUMENTS

| | | |
|---|---|---|
| CN | 103023643 | 4/2013 |
| CN | 103417202 | 12/2013 |
| EP | 1 085 424 | 3/2001 |
| EP | 1 223 565 | 7/2002 |
| EP | 1 265 186 | 12/2002 |
| EP | 1 783 919 | 5/2007 |
| EP | 2 852 070 | 1/2009 |
| EP | 2 139 196 | 12/2009 |
| EP | 1 469 419 | 2/2012 |
| GB | 2 457 221 | 8/2009 |
| GB | 2 516 861 | 2/2015 |
| GB | 2 551 907 | 1/2018 |
| KR | 101508320 | 4/2015 |
| KR | 20150140132 A | 12/2015 |
| WO | 199910824 A1 | 3/1999 |
| WO | WO 00/49586 | 8/2000 |
| WO | WO2006070189 | 7/2006 |
| WO | WO 2008055170 | 5/2008 |
| WO | WO 2009025605 | 2/2009 |
| WO | WO 2010049252 | 5/2010 |
| WO | WO 2011112158 | 9/2011 |
| WO | WO 2012001624 | 1/2012 |
| WO | WO 2013039395 | 3/2013 |
| WO | WO 2013155562 | 10/2013 |
| WO | WO 2013192358 | 12/2013 |
| WO | WO 2014043278 | 3/2014 |
| WO | WO 2014170741 | 10/2014 |
| WO | WO 2015179649 | 11/2015 |
| WO | WO 2015183818 | 12/2015 |
| WO | WO 2016097718 | 6/2016 |
| WO | WO 2016160816 | 10/2016 |
| WO | WO 2016168394 | 10/2016 |
| WO | 2017047855 A1 | 3/2017 |
| WO | WO 2017042375 | 3/2017 |
| WO | WO 2017042400 | 3/2017 |
| WO | WO 2017157859 | 9/2017 |
| WO | WO 2017208063 | 12/2017 |
| WO | WO 2018007828 | 1/2018 |
| WO | WO 2018063809 | 4/2018 |
| WO | WO 2018137888 | 8/2018 |
| WO | 2019022585 A1 | 1/2019 |
| WO | 2021051884 A1 | 3/2021 |
| WO | 2021133492 A1 | 7/2021 |
| WO | 2022108959 A1 | 5/2022 |
| WO | 2022187350 A1 | 9/2022 |
| WO | 2023017943 A1 | 2/2023 |
| WO | 2023064063 A1 | 4/2023 |

OTHER PUBLICATIONS

Nishida et al "Security Evaluation of Counter Synchronization Method for CAN Against DOS Attack," 2019 IEEE 8th Global Conference on Consumer Electronics (GCCE), pp. 166-167 (Year: 2019).*

Shrivastav et al "Globally Synchronized Time via Datacenter Networks," IEEE/ACM Transactions on Networking, vol. 27, No. 4, August, IEEE, pp. 1401-1416 (Year: 2019).*

Zhang et al "Security Analysis and Enhancements of 3GPP Authentication and Key Agreement Protocol," IEEE Transactions on Wireless Communications, vol. 4, No. 2, pp. 734-742 (Year: 2005).*

Bond et al "Chip and Skim: Cloning EMV cards with the Pre-Play Attack," 2014 IEEE Symposium on Security and Privacy, IEEE Computer Society, pp. 49-64 (Year: 2014).*

Senevirathna et al "Hands Free POS Automated RFID Scanning Glove to Reduce Waiting Time of Store Checkout Lines," IEEE, pp. 1-6 (Year: 2016).*

Shu et al "Analysing Convergence of Quantized Congestion Notification in Data Center Ethernet," 2014 IEEE 22nd International Symposium of Quality of Service (IWQoS), IEEE, pp. 71-80 (Year: 2014).*

Lim et al "Secure RFID Identification and Authentication with Triggered Hash Chain Variants," 2008 14th IEEE International Conference on Parallel and Distributed Systems, IEEE Computer Society, pp. 583-590 (Year: 2008).*

Batina, Lejla and Poll, Erik, "SmartCards and RFID," PowerPoint Presentation for IPA Security Course, Digital Security at University of Nijmegen, Netherlands (date unknown), 75 pages.

Haykin M. and Warnar, R., "Smart Card Technology: New Methods for Computer Access Control," Computer Science and Technology NIST Special Publication 500-157:1-60 (1988).

Lehpamer, Harvey, "Component of the RFID System," RFID Design Principles, 2nd edition pp. 133-201 (2012).

Pourghomi, Pardis et al., "A Proposed NFC Payment Application," International Journal of Advanced Computer Science and Applications, vol. 4, No. 8 (2013).

Author Unknown, "CardrefresherSM from American Express®," [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool," [online] 2018-19 [retrieved on Mar. 25, 2019]. Retrieved from Internet URL: https://www.authorize.net/our-features/account-updater/, 5 pages.

Author Unknown, "Visa® Account Updater for Merchants," [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay," Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems," EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifications for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author unknown, "NFC Guide: All You Need to Know About Near Field Communication" Square Guide [online] 2018[retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-pay ments/, 6 pages.

Cozma, N., "Copy data from other devices in Android 5.0 Lollipop setup" CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag" StackExchange [online] 2013 [retrieved on Mar. 25, 2019]. Retrieved

(56) References Cited

OTHER PUBLICATIONS from the Internet URL: https://android.stackexchange.com/questions/55689/how-to-copy-text-string-from-nfc-tag, 11 pages.

Author unknown, "Tap & Go Device Setup" Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.

Katz, J., and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Adams, D., and Maier, A-K, "Goldbug BIG SEVEN open source crypto-messengers to be compared - : or Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple_DES, 2 pages.

Song, F., and Yun, A.1, "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Berg, Guy, "Fundamentals of EMV" Smart Card Alliance [online] date unknown [retrieved on Mar. 27, 2019]. Retrieved from Internet URL: https://www.securetechalliance.org/resources/media/scap13_preconference/02.pdf, 37 pages.

Pierce, Kevin, "Is the amazon echo NFC compatible,?" Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.

Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.

Author unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Menghin, M.J., "Power Optimization Techniques for Near Field Communication Systems" 2014 Dissertation at Technical University of Graz [online]. Retrieved from Internet URL: https://diglib.tugraz.at/download.php?id=576a7b910d2d6&location=browse, 135 pages.

Mareli, M., et al., "Experimental evaluation of NFC reliability between an RFID tag and a smartphone" Conference paper (2013) IEEE Africon at Mauritius [online] [retrieved on Mar. 25, 2019]. Retrieved from Internet URL: https://core.ac.uk/download/pdf/54204839.pdf, 5 pages.

Davison, A., et al., "MonoSLAM: Real-Time Single Camera Slam", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.

Author unknown: "onetappayment™", [online] Jan. 24, 2019, [retrieved on Mar. 25, 2019]. Retrieved from Internet URL: https://www.payubiz.in/onetap, 4 pages.

Vu et al., (2012). "Distinguishing users with capacitive touch communication" Proceedings of the Annual International Conference on Mobile Computing and Networking, MOBICOM. 10.1145/2348543.2348569.

EMVCo, EMV Card Personalization Specification, version 1.0 (Jun. 2003), 81 pages.

Ullmann et al., (2012). "On-Card" User Authentication for Contactless Smart Cards based on Gesture Recognition, LNI, 223-234, 12 pages.

Faraj et al. (2008). "Investigation of Java Smart Card Technology for Multi-Task Applications" J. of Al-Anbar University for Pure Science, vol. 2: No. 1: 2008, 11 pages.

Dhamdhere (2017) "Key Benefits of a Unified Platform for Loyalty, Referral Marketing, and UGC" Annex Cloud [retrieved on Jul. 3, 2019]. Retrieved from Internet URL: https://www.annexcloude.com/blog/benefits-unified-platform/, 13 pages.

International Search Report and the Written Opinion of the International Searching Authority issued in related PCT Application No. PCT/US2022/040223 mailed Nov. 24, 2022, 13 pages.

Sauch, "Getting information from an EMV chip card with Java," 2006, WordPress, pp. 1-13.

Author Unknown, "Global expansion of card tapping mobile OTP for security and convenience is imminent," Jun. 28, 2022, website: https://www.swidch.com/blogs/card-tapping-motp-blog.

Author unknown, "EMV Card Personalization Specification", EMVCo., LLC., specification version 1.0, (2003) 81 pages.

Author Unknown, "EMV Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Emvco: "EMV Card Personalisation Specification", Aug. 1, 2021, pp. 1-114, Retrieved from the Internet: URL: https://www.emvco.com/specification/?post_id=12467.

Smart Card Alliance, "Co-Branded Multi-Application Contactless Cards for Transit and Financial Payment," A Smart Card Alliance Transportation Council White Paper (40 pages), Mar. 2008.

\* cited by examiner

SYSTEMS AND METHODS FOR RESETTING AN AUTHENTICATION COUNTER

FIELD OF THE DISCLOSURE

The present disclosure relates to systems and methods for resetting an authentication counter.

BACKGROUND

Card-based transactions are becoming increasingly common. These transactions often involve the use of a card in communication with a point of sale device, a server, or other device. It is necessary to protect such communications from interception and unauthorized access, and accordingly the communications are often encrypted.

One way to facilitate encryption is to use a counter in connection with one or more encryption algorithms. However, this requires the card and the point of sale device, server, or other device maintain synchronized counter values and a way to reset the counter if it becomes unsynchronized. Without effectively resetting an internal authentication counter of a card, desynchronization issues exist when conducting transactions and verifying expected counter adjustments, which can lead to unauthorized access, fraudulent activity, such as misuse of the card, and increased risk, thereby resulting in reduced security. Even prompting a user that the counter will be reset is susceptible to security vulnerabilities insofar as a malicious attacker receives advance notice of the counter reset.

These and other deficiencies exist. Accordingly, there is a need for systems and methods for resetting an authentication counter that overcome these deficiencies in a secure and reliable manner without prompting a user that the counter will be reset.

SUMMARY OF THE DISCLOSURE

Embodiments of the present disclosure provide a counter resynchronization system, including one or more servers each including a memory and one or more processors. The one or more servers can be in data communication with a transmitting device. The one or more processors can be configured to determine one or more reset events. The one or more processors can be configured to generate a resync value. The one or more processors can be configured to transmit, via one or more scripts, the resync value to the transmitting device according to one or more prioritization factors and in response to the one or more reset events. The one or more processors can be configured to replace the counter value with the resync value in accordance with the one or more prioritization factors.

Embodiments of the present disclosure provide a method of counter resynchronization. The method can include generating, by one or more processors, a first counter value. The method can include determining, by the one or more processors, a plurality of events. The method can include transmitting, by the one or more processors, the first counter value via one or more scripts to a transmitting device based on one or more prioritization factors and in response to the plurality of events. The method can include replacing, by the one or more processors, a second counter value of the transmitting device with the first counter value in accordance with the one or more prioritization factors.

Embodiments of the present disclosure provide a computer readable non-transitory medium comprising computer-executable instructions that are executed on a processor and comprising the steps of: determining one or more reset events; generating a resync value; triggering, based on the one or more reset events, a plurality of corrective actions responsive to the one or more reset events; transmitting the resync value to a transmitting device according to one or more prioritization factors; replacing a counter value of the transmitting device with the resync value; and validating successful execution of the one or more scripts.

BRIEF DESCRIPTION OF THE DRAWINGS

Various embodiments of the present disclosure, together with further objects and advantages, can best be understood by reference to the following description taken in conjunction with the accompanying drawings.

DETAILED DESCRIPTION

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Benefits of the disclosed systems and methods for maintaining and verifying synchronized counter values include improved security to protect communications from interception and unauthorized access. By doing so, the risk of fraudulent activity, such as misuse of the card or an account associated with the card, can be reduced.

Further, the need to prompt a user that the counter will be reset is susceptible to security vulnerabilities insofar as a malicious attacker receives advance notice of the counter reset, and by eliminating this need this risk can be reduced, while simultaneously avoiding counter desynchronization. In addition, by removing the user from involvement in maintaining and synchronizing counter values, user experience and transaction efficiency can be improved.

Figure 1:
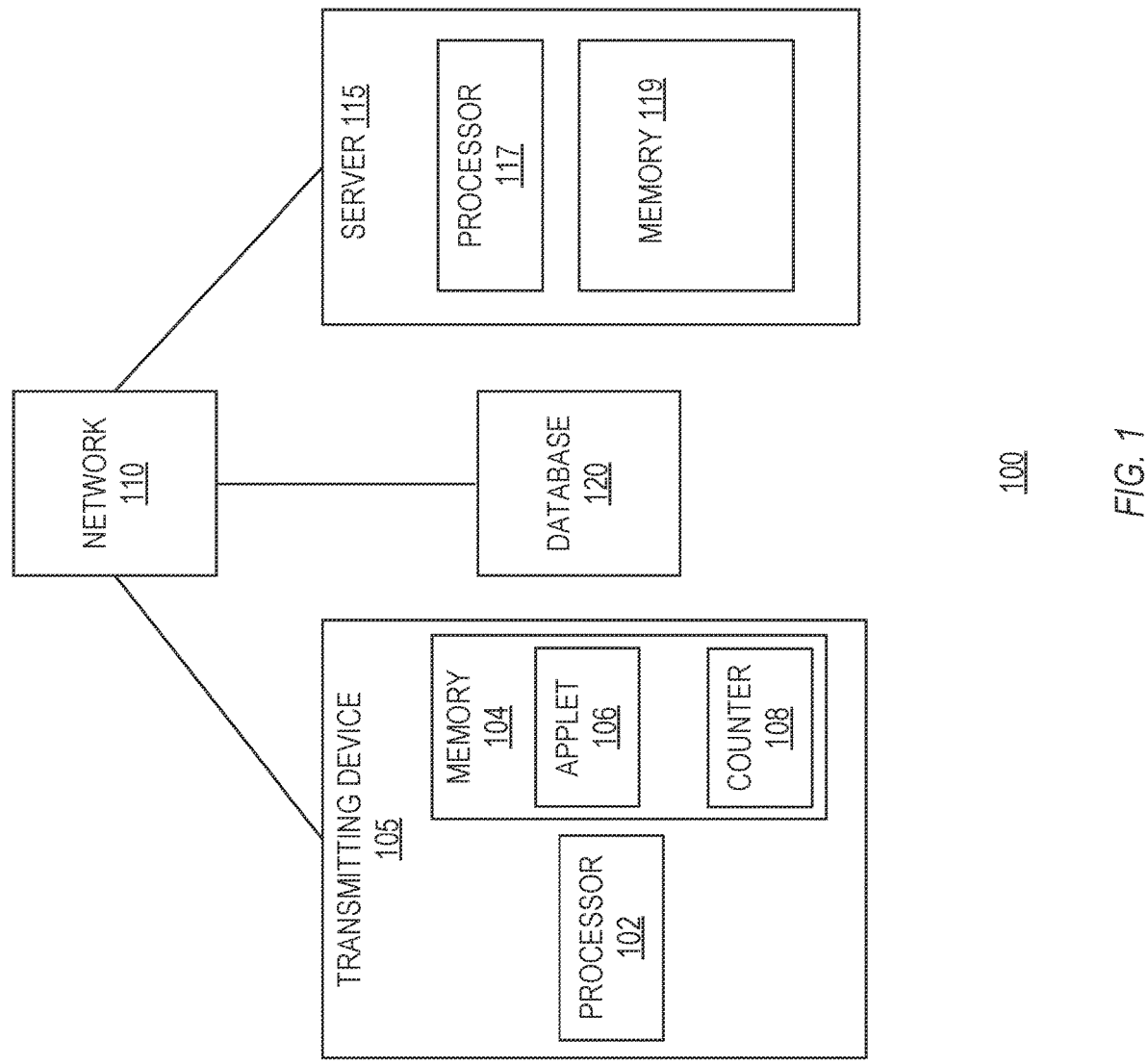
FIG. 1 depicts a counter resynchronization system according to an exemplary embodiment.

FIG. 1 illustrates a counter resynchronization system 100. The counter resynchronization system 100 can comprise a transmitting device 105, a network 110, a server 115, and a database 120. Although FIG. 1 illustrates single instances of components of system 100, system 100 can include any number of components.

System 100 can include a transmitting device 105. The transmitting device 105 can comprise a contactless card, a contact-based card, a network-enabled computer, or other device described herein. As referred to herein, a network-enabled computer can include, but is not limited to a computer device, or communications device including, e.g., a server, a network appliance, a personal computer, a workstation, a phone, a handheld PC, a personal digital assistant, a contactless card, a contact-based card, a thin client, a fat client, an Internet browser, or other device. As further explained below in FIGS. 2A-2B, transmitting device 105 can include one or more processors 102, and memory 104. Memory 104 can include one or more software applications or applets 106 configured to perform the functions and operations described herein. Memory 104 can include one or more counters 108. Each counter 108 can include a counter value. Transmitting device 105 can be in data communication with any number of components of system 100. For example, transmitting device 105 can transmit data via network 110 to server 115. Transmitting device 105 can transmit data via network 110 to database 120. In some examples, transmitting device 105 can be configured to transmit data via network 110 after entry into one or more communication fields of any device. Without limitation, each entry can be associated with a tap, a swipe, a wave, and/or any combination thereof.

System 100 can include a network 110. In some examples, network 110 can be one or more of a wireless network, a wired network or any combination of wireless network and wired network, and can be configured to connect to any one of components of system 100. For example, transmitting device 105 can be configured to connect to server 115 via network 110. In some examples, network 110 can include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 110 can include, without limitation, telephone lines, fiber optics, IEEE Ethernet 902.3, a wide area network, a wireless personal area network, a LAN, or a global network such as the Internet. In addition, network 110 can support an Internet network, a wireless communication network, a cellular network, or the like, or any combination thereof. Network 110 can further include one network, or any number of the exemplary types of networks mentioned above, operating as a stand-alone network or in cooperation with each other. Network 110 can utilize one or more protocols of one or more network elements to which they are communicatively coupled. Network 110 can translate to or from other protocols to one or more protocols of network devices. Although network 110 is depicted as a single network, it should be appreciated that according to one or more examples, network 110 can comprise a plurality of interconnected networks, such as, for example, the Internet, a service provider's network, a cable television network, corporate networks, such as credit card association networks, and home networks.

System 100 can include one or more servers 115. In some examples, server 115 can include one or more processors 117 coupled to memory 119. Server 115 can be configured as a central system, server or platform to control and call various data at different times to execute a plurality of workflow actions. Server 115 can be configured to connect to transmitting device 105. Server 115 can be in data communication with the applet 106. For example, a server 115 can be in data communication with applet 106 via one or more networks 110. Transmitting device 105 can be in communication with one or more servers 115 via one or more networks 110, and can operate as a respective front-end to back-end pair with server 115. Transmitting device 105 can transmit, for example from applet 106 executing thereon, one or more requests to server 115. The one or more requests can be associated with retrieving data from server 115. Server 115 can receive the one or more requests from transmitting device 105. Based on the one or more requests from applet 106, server 115 can be configured to retrieve the requested data. Server 115 can be configured to transmit the received data to applet 106, the received data being responsive to one or more requests.

In some examples, server 115 can be a dedicated server computer, such as a bladed server, or can be a personal computer, laptop computer, notebook computer, palm top computer, network computer, mobile device, wearable device, or any processor-controlled device capable of supporting the system 100. While FIG. 1 illustrates a single server 115, it is understood that other embodiments can use multiple servers or multiple computer systems as necessary or desired to support the users and can also use back-up or redundant servers to prevent network downtime in the event of a failure of a particular server.

Server 115 can include an application (e.g., a software application, an applet, a script) comprising instructions for execution thereon. For example, the application can comprise instructions for execution on the server 115. The application can be in communication with any components of system 100. For example, server 115 can execute one or more applications that enable, for example, network and/or data communications with one or more components of system 100, transmit and/or receive data, and perform the functions and operations described herein. Without limitation, server 115 can be a network-enabled computer. Server 115 also can be a mobile device; for example, a mobile device can include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server 115 can include processing circuitry and can contain additional components, including processors, memories, error and parity/CRC checkers, data encoders, anticollision algorithms, controllers, command decoders, security primitives and tamperproofing hardware, as necessary to perform the functions described herein. The server 115 can further include a display and input devices. The display can be any type of device for presenting visual information such as a computer monitor, a flat panel display, and a mobile device screen, including liquid crystal displays, light-emitting diode displays, plasma panels, and cathode ray tube displays. The input devices can include any device for entering information into the user's device that is available and supported by the user's device, such as a touch-screen, keyboard, mouse, cursor-control device, touch-screen, microphone, digital camera, video recorder or camcorder. These devices can be used to enter information and interact with the software and other devices described herein.

System 100 can include one or more databases 120. The database 120 can comprise a relational database, a non-relational database, or other database implementations, and any combination thereof, including a plurality of relational databases and non-relational databases. In some examples, the database 120 can comprise a desktop database, a mobile database, or an in-memory database. Further, the database 120 can be hosted internally by the transmitting device 105 or server 115, or the database 120 can be hosted externally to the transmitting device 105 and server 115, by a cloud-based platform, or in any storage device that is in data communication with the transmitting device 105 and server 115. In some examples, database 120 can be in data communication with any number of components of system 100. For example, server 115 can be configured to retrieve the requested data from the database 120 that is transmitted by applet 106. Server 115 can be configured to transmit the received data from database 120 to applet 106 via network 110, the received data being responsive to the transmitted one or more requests. In other examples, applet 106 can be configured to transmit one or more requests for the requested data from database 120 via network 110.

In some examples, exemplary procedures in accordance with the present disclosure described herein can be performed by a processing arrangement and/or a computing arrangement (e.g., computer hardware arrangement). Such processing/computing arrangement can be, for example entirely or a part of, or include, but not limited to, a computer/processor that can include, for example one or more microprocessors, and use instructions stored on a computer-accessible medium (e.g., RAM, ROM, hard drive, or other storage device). For example, a computer-accessible medium can be part of the memory of the transmitting device 105, server 115, and/or database 120, or other computer hardware arrangement.

In some examples, a computer-accessible medium (e.g., as described herein above, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein above, for example.

The one or more processors 117 can be configured to determine one or more reset events. For example, at least one of the one or more reset events can comprise exceeding a first threshold differential between the counter value and a resync value. The first threshold differential can comprise a value within a first range. One of the one or more reset events can comprise exceeding a second threshold differential between the counter value and a resync value. The second threshold differential can comprise a value within a second range. The second threshold differential can be greater than the first threshold differential. Without limitation, the first threshold differential can comprise a value of 5 that is within a range of 1 to 10. Without limitation, the second threshold differential can comprise a value of 50 that is within a range of 1 to 100. For example, there can be an instance in which the counter value of the transmitting device 105 is off by a 5 or less, which is different than an instance in which the counter value of the transmitting device 105 is off by 100 or more, thereby leading to desynchronization issues between the card and the one or more processors 117. Depending on the threshold differential value, the counter value of the transmitting device 105 can be reset by the one or more processors 117 at the next data communication with a device, such as a point of sales device, as further explained below.

In another example, one of the one or more reset events, as determined by the one or more processors 117, can comprise counter overflow associated with the resync value and the counter value. For example, if the one or more processors 117 determine that the counter value of the transmitting device 105 is approaching or will imminently approach counter overflow such that a large value is about to reach, the one or more processors 117 can be configured to determine an associated reset event so as to transmit the resync value to the transmitting device 105, in which the counter value of the transmitting device 105 is replaced with the resync value received from the one or more processors 117. The one or more processors 117 can be configured to assign one or more integer values associated with the counter value. For example, a 2 byte unsigned integer can comprise a minimum value of 0 and a maximum value of 65,535. In one example, the transmitting device 105 can have a lifespan of any time duration, including but not limited to 1 day, 1 month, 1 year, 2 years, 5 years, etc. The counter value of the transmitting device 105 can be configured to increment any number, or predetermine threshold number, of times, such as 4 counter increments for the given time duration. For an exemplary 5 year time duration, this would yield 7,300 counter increments over the lifespan of the transmitting device 105. In this manner, the counter value of the transmitting device 105 can be selected and/or adjusted to increment so as to avoid approaching the maximum value and/or counter increments.

In response to the one or more reset events, the one or more processors 117 can be configured to transmit one or more values to the transmitting device 105. For example, the one or more processors 117 can be configured to transmit, via one or more scripts, the one or more values to the transmitting device 105. The one or more scripts can be transmitted as part of an authorization response. For example, the one or more scripts can be sent by an issuer of the transmitting device 105 in a transaction authorization response. The one or more scripts can be generated and/or transmitted on a periodic or predetermined schedule in order to resync counter values that have not been replaced for a predetermined time, including but not limited to any number of seconds, minutes, hours, days, weeks, months, years, etc. In one example, the one or more scripts can be transmitted every day. In another example, the one or more scripts can be transmitted to resync counter values that are 30 days old. Without limitation, the one or more scripts can be configured to update and change one or more values, such as a counter value, of the transmitting device 105. In this manner, the changes can improve the risk functions of an applet on the transmitting device 105 and reduce or prevent fraudulent activity during the lifetime of the transmitting device 105. In some examples, server 115 can store the one or more scripts. In other examples, the one or more scripts can be retrieved from a database, such as database 120.

For example, the one or more processors 117 can be configured to transmit a resync value to the transmitting device 105. In some examples, the one or more processors 117 can be configured to generate the one or more values. The resync value can include, for example, 2 bytes of unsigned integer with a maximum value of 65,535. For example, the one or more processors 117 can be configured to generate the resync value. The one or more processors 117 can be configured to transmit the resync value through a channel. In some examples, the channel can comprise an out-of-band channel.

In some examples, the one or more processors 117 can be configured to periodically generate the resync value and/or transmit the resync value to the transmitting device 105. In some examples, the one or more processors 117 can be configured to reset the counter value of the transmitting device 105 at a predetermined time, such as every second, minute, hour, day, week, month, year, and/or any combination thereof by replacing the counter value with the resync value.

In other examples, the counter value of the transmitting device 105 can be replaced with the resync value received from the one or more processors 117 at the next connection with a device, such as contact-based connection between the transmitting device 105 and a point of sale device. Since the counter of the transmitting device 105 is immutable, this approach improves upon existing solutions in which only the counter on the server 115 is updated to match that of the transmitting device 105. In this example, the counter value of the transmitting device 105 can be reset based on the determination of the threshold differential value. For example, depending on the threshold differential value, such as the counter value of the transmitting device 105 being off by 50 instead of 5, the counter value of the transmitting device 105 can be reset at the next data communication with a device, such as a transaction between the transmitting device 105 and a point of sales device. In some examples, the contact-based connection can comprise the insertion of the transmitting device 105 into the point of sales device. In this manner, the user does not need to be prompted by the device in order to replace the counter value of the transmitting device 105 with the resync value generated and/or transmitted by the one or more processors 117. In other examples, the counter value of the transmitting device 105 can be replaced with the resync value received from the one or more processors 117 at the next connection with a device, such as contactless-based connection between the transmitting device 105 and a point of sales device. The transmitting device 105 can be configured to receive the resync value from the one or more processors 117. For example, the transmitting device 105 can be configured to periodically receive the resync value from the one or more processors 117. In some examples, the transmitting device 105 and the one or more processors 117 can be configured to replace the counter value with the resync value. For example, the counter value of the transmitting device 105 can be overridden by the supplied resync value at each instance the transmitting device 105 is inserted into a device, such as a point of sale device. In this manner, desynchronization of the counter values between the one or more processors 117 and transmitting device 105 is avoided.

In some examples, the one or more processors 117 can be configured to prioritize when the resync value should be transmitted to replace the counter value of the transmitting device 105. The prioritization can be based on one or more prioritization factors. For example, at least one of the prioritization factors can comprise a threshold differential in determining whether a transmitting device 105, such as a particular transmitting device, is given preferential treatment to replace its counter value with the resync value from the one or more processors 117. The one or more processors 117 can be configured to trigger a reset of the counter value of the transmitting device 105 if the counter value yields a desired value. In this manner, prioritization of resyncing the counter value with the one or more processors 117 is based on a reactive approach, since the one or more processors 117 can be configured to determine if the threshold differential is reached, such as the counter value being off by 500 as opposed to the counter value being off by 5.

In another example, at least one of the prioritization factors can comprise the one or more processors 117 configured to trigger a reset of the counter value of the transmitting device 105 after a predetermined time, such as, without limitation, after two weeks or three months. In this manner, prioritization of resyncing the counter value with the one or more processors 117 is based on a proactive approach. In some examples, the one or more processors 117 can be configured to trigger a reset of the counter value of the transmitting device 105 if the transmitting device 105 has been issued within, e.g., the past 8 months. In another example, the one or more processors 117 can be configured to trigger a reset of the counter value of the transmitting device 105 if the counter value has not been reset after, e.g., 4 months.

The one or more processors 117 can be configured to perform a validation process that the resync value was transmitted, received, and executed to replace the counter value of the transmitting device 105 with the resync value. For example, the validation process can comprise receiving an outcome of execution status of the one or more scripts. In some examples, the validation process can include receiving a confirmation indicative of successful execution of the one or more scripts. For example, the one or more processors 117 can be configured to receive, from the transmitting device 105, that the transmitting device 105 received the one or more scripts and executed the one or more scripts. In other examples, the validation process can include determining or receiving a confirmation indicative of unsuccessful execution of the one or more scripts. If the confirmation is indicative of an unsuccessful execution of the one or more scripts, the one or more scripts can be re-transmitted and/or re-executed up to and including a predetermined number of times before the entire process times out. In some examples, after reaching a predetermined number of failures of the script execution, the transmitting device 105 can be locked and can be substituted by issuance of a replacement transmitting device. In another example, the one or more processors 117 can be configured to determine that the one or more scripts successfully executed.

In response to the one or more reset events, the one or more processors 117 and/or database 120 can be configured to trigger one or more corrective actions. For example, the one or more corrective actions can include at least one selected from the group of blocking data communication with the transmitting device 105 or otherwise disabling data communication, disabling one or more accounts associated with a user, logging one or more records, and/or any combination thereof, and can be in response to any of the one or more reset events. In some examples, the one or more accounts associated with a user can be disabled for a predetermined period of time, including but not limited to seconds, minutes, hours, days, weeks, months, years, and/or any combination thereof. In other examples, the one or more accounts associated with a user can be disabled for certain transactions and merchants, including but not limited to one or more merchants located within a predetermined geographic range. In some examples, the logging of one or more records can be associated with flagging the one or more reset events in a database. Without limitation, the one or more processors 117 and/or database 120 can be configured to monitor the flagged one or more reset events in order to determine if and when a new resync value should be generated, if and when the resync value should be transmitted to the transmitting device 105, and/or if and when the transmitting device 105 should be deactivated. The one or more processors 117 and/or database 120 can be configured to determine if and when the transmitting device 105 should be reactivated.

Figure 2A:
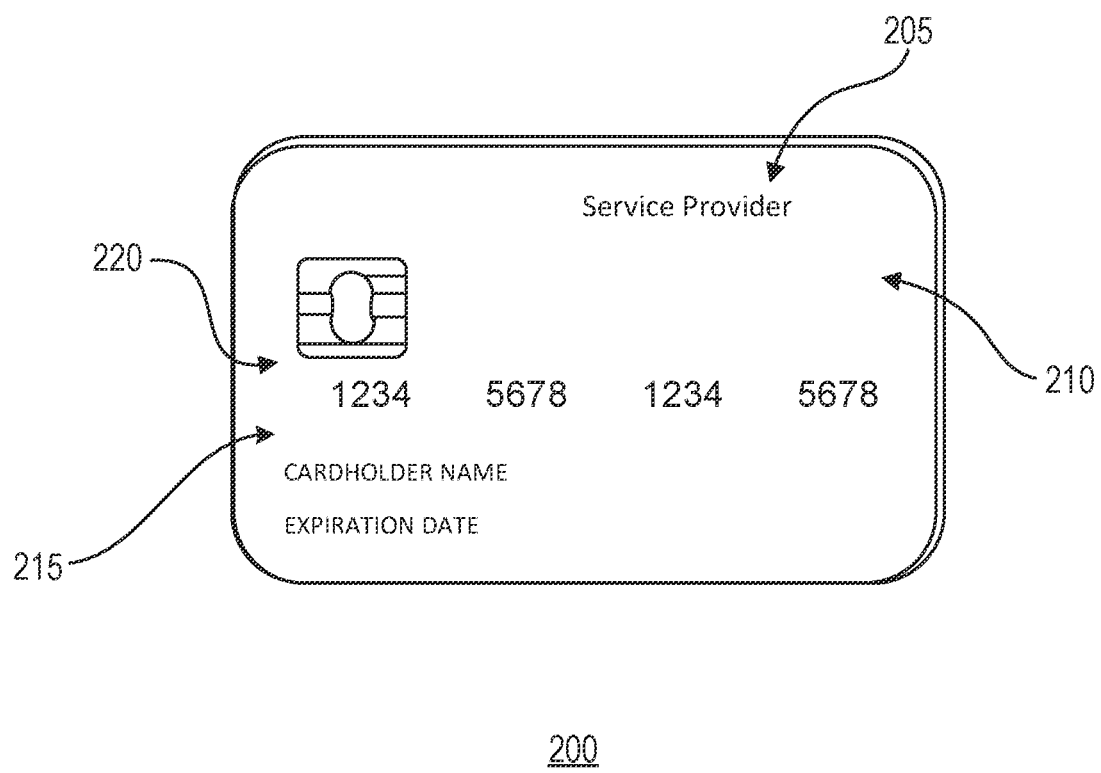
FIG. 2A is an illustration of a contactless card according to an exemplary embodiment.

FIG. 2A illustrates one or more transmitting devices 200. Transmitting device 200 can reference the same or similar components of transmitting device 105, as explained above with respect to FIG. 1. Although FIGS. 2A and 2B illustrate single instances of components of transmitting device 200, any number of components can be utilized.

Transmitting device 200 can be configured to communicate with one or more components of system 100. Transmitting device 200 can comprise a contact-based card or contactless card, which can comprise a payment card, such as a credit card, debit card, or gift card, issued by a service provider 205 displayed on the front or back of the transmitting device 200. In some examples, the transmitting device 200 is not related to a payment card, and can comprise, without limitation, an identification card, a membership card, and a transportation card. In some examples, the payment card can comprise a dual interface contactless payment card. The transmitting device 200 can comprise a substrate 210, which can include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the transmitting device 200 can have physical characteristics compliant with the ID-1 format of the ISO/IEC 7810 standard, and the contactless card can otherwise be compliant with the ISO/IEC 14443 standard. However, it is understood that the transmitting device 200 according to the present disclosure can have different characteristics, and the present disclosure does not require a contactless card to be implemented in a payment card.

The transmitting device 200 can also include identification information 215 displayed on the front and/or back of the card, and a contact pad 220. The contact pad 220 can be configured to establish contact with another communication device, including but not limited to a user device, smart phone, laptop, desktop, or tablet computer. The transmitting device 200 can also include processing circuitry, antenna and other components not shown in FIG. 2A. These components can be located behind the contact pad 220 or elsewhere on the substrate 210. The transmitting device 200 can also include a magnetic strip or tape, which can be located on the back of the card (not shown in FIG. 2A).

Figure 2B:
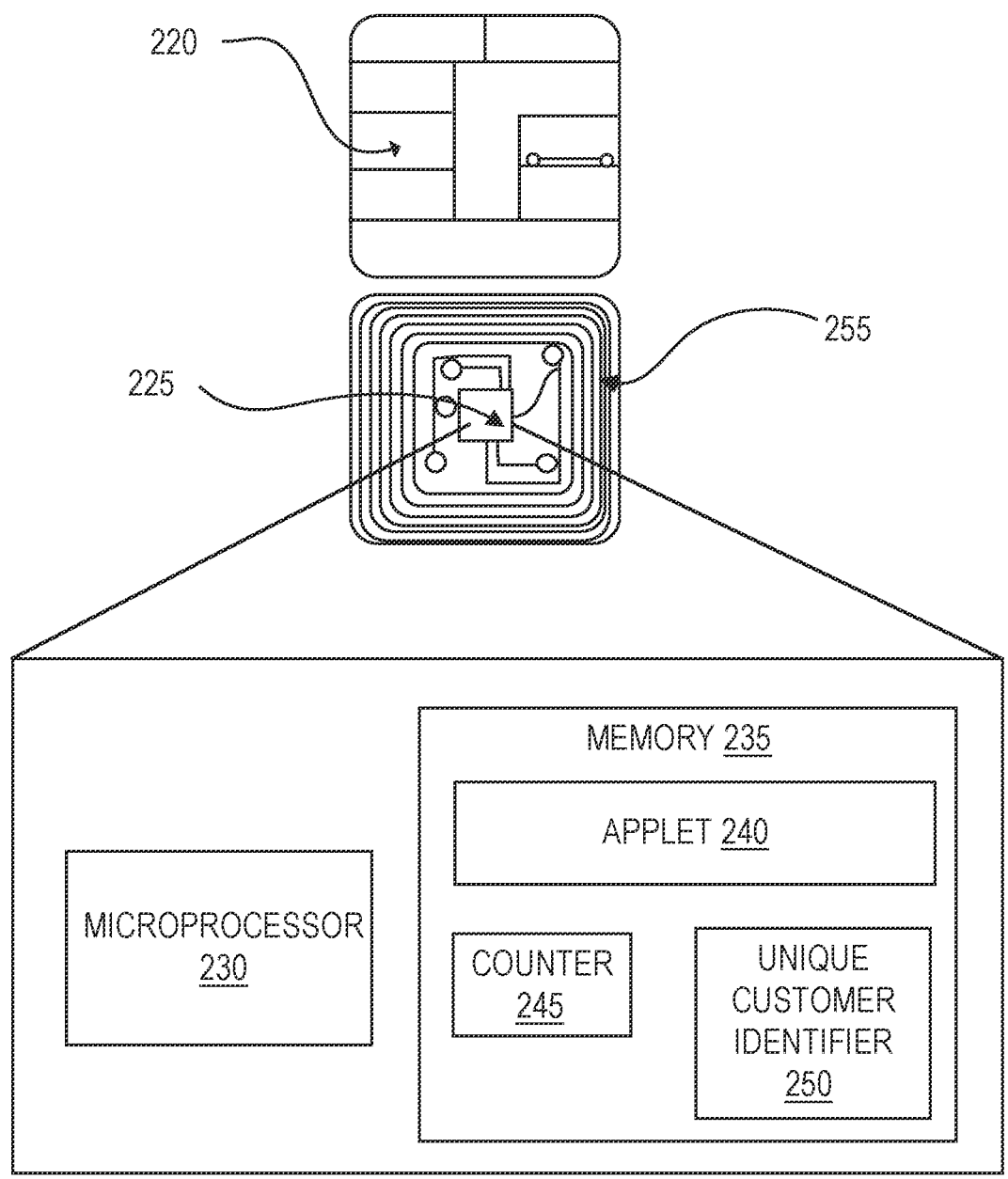
FIG. 2B is an illustration of a contact pad of a contactless card according to an exemplary embodiment.

As illustrated in FIG. 2B, the contact pad 220 of FIG. 2A can include processing circuitry 225 for storing and processing information, including a processor 230, such as a microprocessor, and a memory 235. It is understood that the processing circuitry 225 can contain additional components, including processors, memories, error and parity/CRC checkers, data encoders, anticollision algorithms, controllers, command decoders, security primitives and tamper-proofing hardware, as necessary to perform the functions described herein.

The memory 235 can be a read-only memory, write-once read-multiple memory or read/write memory, e.g., RAM, ROM, and EEPROM, and the transmitting device 200 can include one or more of these memories. A read-only memory can be factory programmable as read-only or one-time programmable. One-time programmability provides the opportunity to write once then read many times. A write once/read-multiple memory can be programmed at a point in time after the memory chip has left the factory. Once the memory is programmed, it cannot be rewritten, but it can be read many times. A read/write memory can be programmed and re-programed many times after leaving the factory. It can also be read many times.

The memory 235 can be configured to store one or more applets 240, one or more counters 245, and a customer identifier 250. The one or more applets 240 can comprise one or more software applications configured to execute on one or more contactless cards, such as Java Card applet, and perform the functions and operations described herein. However, it is understood that applets 240 are not limited to Java Card applets, and instead can be any software application operable on contactless cards or other devices having limited memory. The one or more counters 245 can comprise a numeric counter sufficient to store an integer. The customer identifier 250 can comprise a unique alphanumeric identifier assigned to a user of the transmitting device 200, and the identifier can distinguish the user of the contactless card from other contactless card users. In some examples, the customer identifier 250 can identify both a customer and an account assigned to that customer and can further identify the contactless card associated with the customer's account.

The processor and memory elements of the foregoing exemplary embodiments are described with reference to the contact pad, but the present disclosure is not limited thereto. It is understood that these elements can be implemented outside of the contact pad 220 or entirely separate from it, or as further elements in addition to processor 230 and memory 235 elements located within the contact pad 220.

In some examples, the transmitting device 200 can comprise one or more antennas 255. The one or more antennas 255 can be placed within the transmitting device 200 and around the processing circuitry 225 of the contact pad 220. For example, the one or more antennas 255 can be integral with the processing circuitry 225 and the one or more antennas 255 can be used with an external booster coil. As another example, the one or more antennas 255 can be external to the contact pad 220 and the processing circuitry 225.

In an embodiment, the coil of transmitting device 200 can act as the secondary of an air core transformer. The terminal can communicate with the transmitting device 200 by cutting power or amplitude modulation. The transmitting device 200 can infer the data transmitted from the terminal using the gaps in the contactless card's power connection, which can be functionally maintained through one or more capacitors. The transmitting device 200 can communicate back by switching a load on the contactless card's coil or load modulation. Load modulation can be detected in the terminal's coil through interference.

Figure 3:
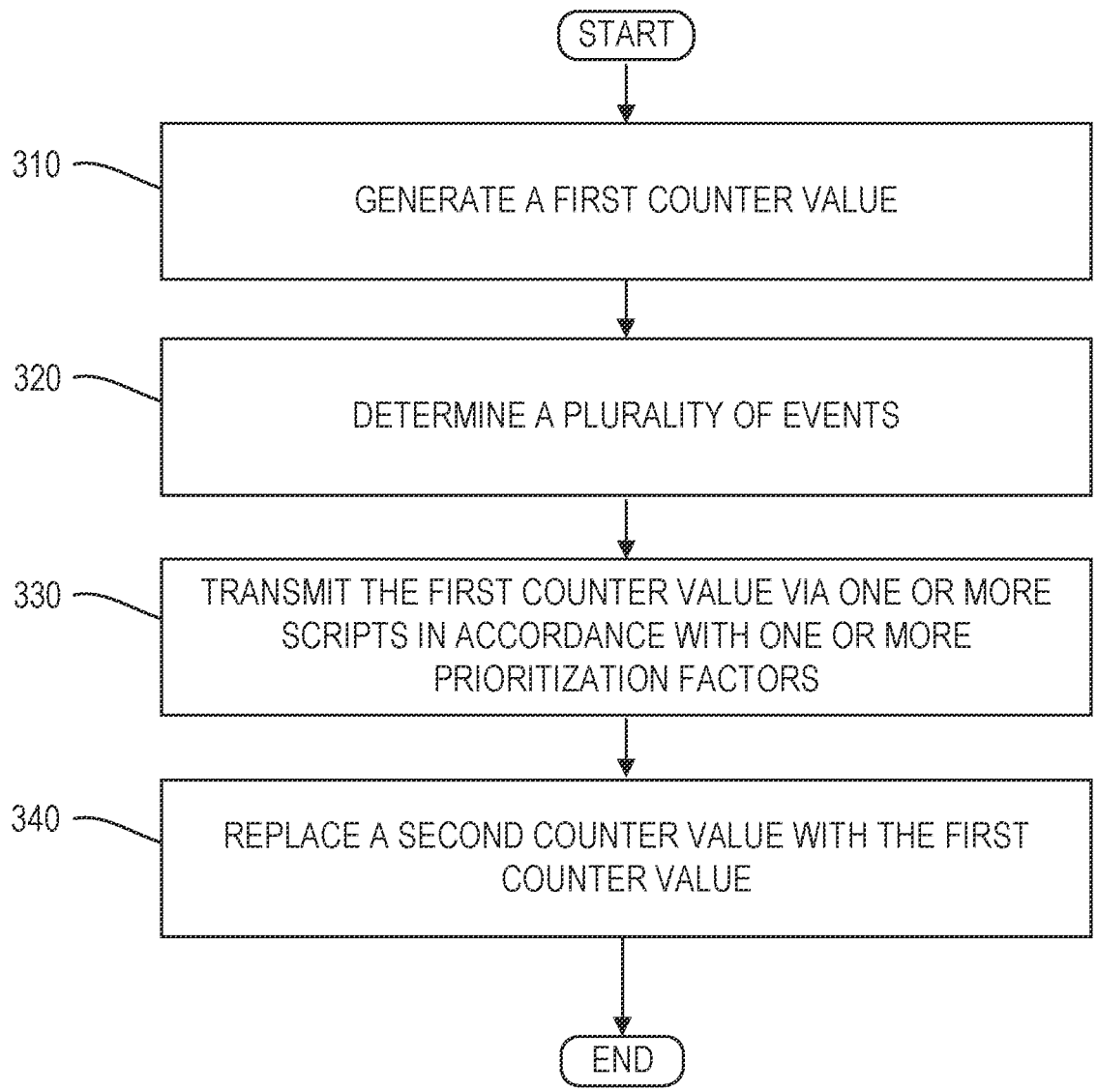
FIG. 3 depicts a method of counter resynchronization according to an exemplary embodiment.

FIG. 3 depicts a method 300 of counter resynchronization. FIG. 3 can reference the same or similar components of system 100, and transmitting device 200 of FIG. 2A and FIG. 2B.

At block 310, the method 300 can include generating, by one or more processors, a first counter value. The one or more processors can be a part of a server. In some examples, the first counter value can comprise a resync value. The resync value can include, for example, 2 bytes of unsigned integer with a maximum value of 65,535. For example, the one or more processors can be configured to generate the resync value.

At block 320, the method 300 can include determining, by the one or more processors, a plurality of events. For example, at least one of the reset events can comprise exceeding a first threshold differential between the counter value and a resync value. The first threshold differential can comprise a value within a first range. At least one of the reset events can comprise exceeding a second threshold differential between the counter value and a resync value. The second threshold differential can comprise a value within a second range. The second threshold differential can be greater than the first threshold differential. Without limitation, the first threshold differential can comprise a value of 5 that is within a range of 1 to 10. Without limitation, the second threshold differential can comprise a value of 50 that is within a range of 1 to 100. For example, there can be an instance in which the counter value of the transmitting device is off by a 5 or less, which is different than an instance in which the counter value of the transmitting device is off by 100 or more, thereby leading to desynchronization issues between the card and the one or more processors. Depending on the threshold differential value, the counter can be reset by the one or more processors at the next data communication with a device, such as a point of sale device, as further explained below.

In another example, at least one of the reset events, as determined by the one or more processors, can comprise counter overflow associated with the resync value and the counter value. For example, if the one or more processors determine that the counter value of the transmitting device is approaching or will imminently approach counter overflow such that a large value is about to reach, the one or more processors can be configured to determine an associated reset event so as to transmit the resync value to the transmitting device, in which the counter value of the transmitting device is replaced with the resync value received from the one or more processors. The one or more processors can be configured to assign one or more integer values associated with the counter value. For example, a 2 byte unsigned integer can comprise a minimum value of 0 and a maximum value of 65,535. In one example, the transmitting device can have a lifespan of any time duration, including but not limited to 1 day, 1 month, 1 year, 2 years, 5 years, etc. The counter value of the transmitting device can be configured to increment any number, or predetermine threshold number, of times, such as 4 counter increments for the given time duration. For an exemplary 5 year time duration, this would yield 7,300 counter increments over the lifespan of the transmitting device. In this manner, the counter value of the transmitting device can be selected and/or adjusted to increment so as to avoid approaching the maximum value and/or counter increments.

At block 330, the method 300 can include transmitting, by the one or more processors, the first counter value via one or more scripts to a transmitting device based on one or more prioritization factors and in response to the plurality of events. In response to the one or more reset events, the one or more processors can be configured to transmit one or more values to the transmitting device. For example, the one or more processors can be configured to transmit, via one or more scripts, the one or more values to the transmitting device. The one or more scripts can be transmitted as part of an authorization response. For example, the one or more scripts can be sent by an issuer of the transmitting device in a transaction authorization response. The one or more scripts can be generated and/or transmitted on a periodic or predetermined schedule in order to resync counter values that have not been replaced for a predetermined time, including but not limited to any number of seconds, minutes, hours, days, weeks, months, years, etc. In one example, the one or more scripts can be transmitted every day. In another example, the one or more scripts can be transmitted to resync counter values that are 30 days old. Without limitation, the one or more scripts can be configured to update and change one or more values, such as a counter value, of the transmitting device. In this manner, the changes can improve the risk functions of an applet on the transmitting device and reduce or prevent fraudulent activity during the lifetime of the transmitting device. In some examples, server can store the one or more scripts. In other examples, the one or more scripts can be retrieved from a database, such as database.

For example, the one or more processors can be configured to transmit a resync value to the transmitting device. In some examples, the one or more processors can be configured to generate the one or more values. The one or more processors can be configured to transmit the resync value through a channel. In some examples, the channel can comprise an out-of-band channel.

At block 340, the method 300 can include replacing, by the one or more processors, a second counter value with the first counter value in accordance with the one or more prioritization factors. The second counter value can comprise a counter value of the transmitting device. In some examples, the one or more processors can be configured to periodically generate the resync value and/or transmit the resync value to the transmitting device. In some examples, the one or more processors can be configured to reset the counter value of the transmitting device at a predetermined time, such as every second, minute, hour, day, week, month, year, and/or any combination thereof by replacing the counter value with the resync value.

In other examples, the counter value of the transmitting device can be replaced with the resync value received from the one or more processors at the next connection with a device, such as contact-based connection between the transmitting device and a point of sales device. Since the counter of the transmitting device is immutable, this approach improves upon existing solutions in which only the counter on the server is updated to match that of the transmitting device. In this example, the counter value of the transmitting device can be reset based on the determination of the threshold differential value. For example, depending on the threshold differential value, such as the counter value of the transmitting device being off by 50 instead of 5, the counter value of the transmitting device can be reset at the next data communication with a device, such as a transaction between the transmitting device and a point of sales device. In some examples, the contact-based connection can comprise the insertion of the transmitting device into the point of sales device. In this manner, the user does not need to be prompted by the device in order to replace the counter value of the transmitting device with the resync value generated and/or transmitted by the one or more processors. In other examples, the counter value of the transmitting device can be replaced with the resync value received from the one or more processors at the next connection with a device, such as contactless-based connection between the transmitting device and a point of sales device.

The transmitting device can be configured to receive the resync value from the one or more processors. For example, the transmitting device can be configured to periodically receive the resync value from the one or more processors. In some examples, the transmitting device and the one or more processors can be configured to replace the counter value with the resync value. For example, the counter value of the transmitting device can be overridden by the supplied resync value at each instance the transmitting device is inserted into a device, such as a point of sale device. In this manner, desynchronization of the counter values between the one or more processors and transmitting device is avoided.

In some examples, the one or more processors can be configured to prioritize when the resync value should be transmitted to replace the counter value of the transmitting device. The prioritization can be based on one or more factors. For example, at least one of factors can comprise a threshold differential in determining whether a particular transmitting device is given preferential treatment to replace its counter value with the resync value from the one or more processors. The one or more processors can be configured to trigger a reset of the counter value of the transmitting device if the counter value yields a desired value. In this manner, prioritization of resyncing the counter value with the one or more processors is based on a reactive approach, since the one or more processors can be configured to determine if the threshold differential is reached, such as the counter value being off by 500 as opposed to the counter value being off by 5.

In another example, at least one of the factors can comprise the one or more processors configured to trigger a reset of the counter value of the transmitting device after a predetermined time, such as, without limitation, after two weeks or three months. In this manner, prioritization of resyncing the counter value with the one or more processors is based on a proactive approach. In some examples, the one or more processors can be configured to trigger a reset of the counter value of the transmitting device if the transmitting device has been issued within, e.g., the past 8 months. In another example, the one or more processors can be configured to trigger a reset of the counter value of the transmitting device if the counter value has not been reset after, e.g., 4 months.

The one or more processors can be configured to perform a validation process that the resync value was transmitted, received, and executed to replace the counter value of the transmitting device with the resync value. For example, the validation process can comprise receiving an outcome of execution status of the one or more scripts. In some examples, the validation process can include receiving a confirmation indicative of successful execution of the one or more scripts. For example, the one or more processors can be configured to receive, from the transmitting device, that the transmitting device received the one or more scripts and executed the one or more scripts. In other examples, the validation process can include determining or receiving a confirmation indicative of unsuccessful execution of the one or more scripts. If the confirmation is indicative of an unsuccessful execution of the one or more scripts, the one or more scripts can be re-transmitted and/or re-executed up to and including a predetermined number of times before the entire process times out. In some examples, after reaching a predetermined number of failures of the script execution, the transmitting device can be locked and can be substituted by issuance of a replacement transmitting device. In another example, the one or more processors can be configured to determine that the one or more scripts successfully executed.

In response to the one or more reset events, the one or more processors and/or database can be configured to trigger one or more corrective actions. For example, the one or more corrective actions can include at least one selected from the group of blocking data communication with the transmitting device or otherwise disabling data communication, disabling one or more accounts associated with a user, logging one or more records, and/or any combination thereof, and can be in response to any of the one or more reset events. In some examples, the one or more accounts associated with a user can be disabled for a predetermined period of time, including but not limited to seconds, minutes, hours, days, weeks, months, years, and/or any combination thereof. In other examples, the one or more accounts associated with a user can be disabled for certain transactions and merchants, including but not limited to one or more merchants located within a predetermined geographic range. In some examples, the logging of one or more records can be associated with flagging the one or more reset events in a database. Without limitation, the one or more processors and/or database can be configured to monitor the flagged one or more reset events in order to determine if and when a new resync value should be generated, if and when the resync value should be transmitted to the transmitting device, and/or if and when the transmitting device should be deactivated. The one or more processors and/or database can be configured to determine if and when the transmitting device should be reactivated.

Figure 4:
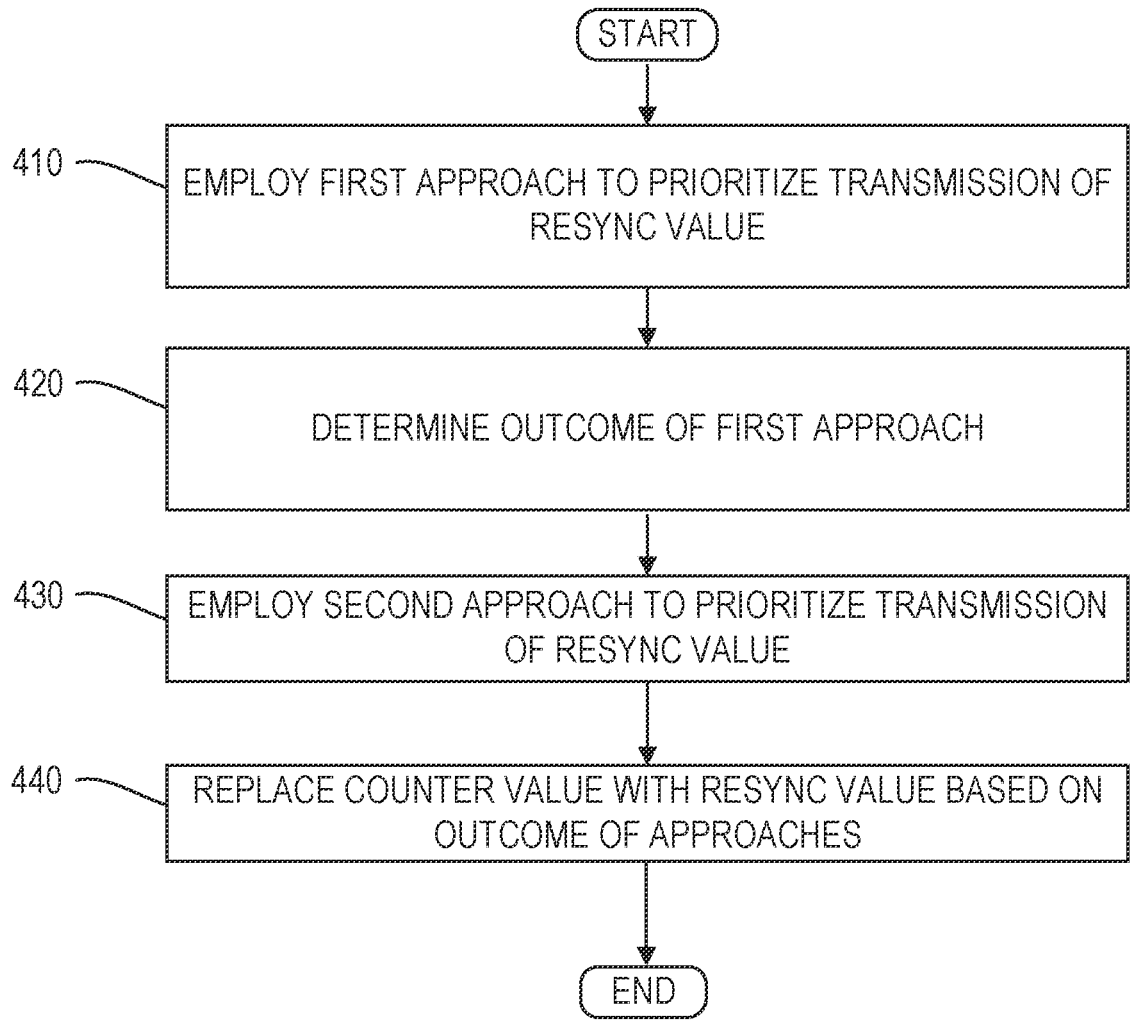
FIG. 4 depicts a method of prioritization of counter resynchronization according to an exemplary embodiment.

FIG. 4 depicts a method of a method of prioritization of counter resynchronization according to an exemplary embodiment. FIG. 4 can reference the same or similar components of system 100, transmitting device 200 of FIG. 2A and FIG. 2B, and method 300 of FIG. 3.

At block 410, the method 400 can include employing a first approach in prioritizing when the resync value is transmitted to replace the counter value. The first approach can comprise a reactive approach. As referred to herein, the reactive approach can include one or more processors configured to generate a determination and then respond or otherwise take action based on the determination. For example, one or more processors of a server can be configured to prioritize when the resync value should be transmitted to replace the counter value of the transmitting device. The prioritization can be based on one or more prioritization factors. For example, at least one of the prioritization factors can be associated with a threshold differential in determining whether a particular transmitting device is given preferential treatment to replace its counter value with the resync value from the one or more processors. The one or more processors can be configured to trigger a reset of the counter value of the transmitting device if the counter value yields a desired value. In this manner, prioritization of resyncing the counter value with the one or more processors is based on a reactive approach, since the one or more processors can be configured to trigger when the resync value should be transmitted after a determination of reaching a threshold differential, such as the counter value being off by 500 as opposed to the counter value being off by 5.

At block 420, the method 400 can include transmitting, based on the outcome of the first approach, the resync value. For example, this can include transmitting, by the one or more processors, the first counter value via one or more scripts to a transmitting device based on the results of the first approach and in response to the plurality of events. In response to the one or more reset events, the one or more processors can be configured to transmit one or more resync values to the transmitting device. For example, the one or more processors can be configured to transmit, via one or more scripts, the one or more resync values to the transmitting device. The one or more scripts can be transmitted as part of an authorization response. For example, the one or more scripts can be sent by an issuer of the transmitting device in a transaction authorization response. The one or more scripts can be generated and/or transmitted on a periodic or predetermined schedule in order to resync counter values that have not been replaced for a predetermined time, including but not limited to any number of seconds, minutes, hours, days, weeks, months, years, etc. In one example, the one or more scripts can be transmitted every day. In another example, the one or more scripts can be transmitted to resync counter values that are 30 days old. Without limitation, the one or more scripts can be configured to update and change one or more values, such as a counter value, of the transmitting device. In this manner, the changes can improve the risk functions of an applet on the transmitting device and reduce or prevent fraudulent activity during the lifetime of the transmitting device. In some examples, server can store the one or more scripts. In other examples, the one or more scripts can be retrieved from a database, such as database. For example, the one or more processors can be configured to transmit a resync value to the transmitting device. In some examples, the one or more processors can be configured to generate the one or more resync values. The one or more processors can be configured to transmit the resync value through a channel. In some examples, the channel can comprise an out-of-band channel.

At block 430, the method 400 can include employing a second approach in prioritizing when the resync value is transmitted to replace the counter value. The second approach can comprise a proactive approach. As referred to herein, the proactive approach can include one or more processors configured to take action based on, for example, expiration of a predetermined time. For example, at least one of the factors can comprise the one or more processors configured to trigger a reset of the counter value of the transmitting device after a predetermined time, such as, without limitation, after two weeks or three months. In this manner, prioritization of resyncing the counter value with the one or more processors is based on a proactive approach. In some examples, the one or more processors can be configured to trigger a reset of the counter value of the transmitting device if the transmitting device has been issued within, e.g., the past 8 months. In another example, the one or more processors can be configured to trigger a reset of the counter value of the transmitting device if the counter value has not been reset after, e.g., 4 months.

At block 440, the method 400 can include transmitting, based on the outcome of the second approach, the resync value. For example, this can include transmitting, by the one or more processors, the first counter value via one or more scripts to a transmitting device based on the results of the second approach and in response to the plurality of events. In response to the one or more reset events, the one or more processors can be configured to transmit one or more resync values to the transmitting device. For example, the one or more processors can be configured to the transmit, via one or more scripts, the one or more resync values to the transmitting device. The one or more scripts can be transmitted as part of an authorization response. For example, the one or more scripts can be sent by an issuer of the transmitting device in a transaction authorization response. The one or more scripts can be generated and/or transmitted on a periodic or predetermined schedule in order to resync counter values that have not been replaced for a predetermined time, including but not limited to any number of seconds, minutes, hours, days, weeks, months, years, etc. In one example, the one or more scripts can be transmitted every day. In another example, the one or more scripts can be transmitted to resync counter values that are 30 days old. Without limitation, the one or more scripts can be configured to update and change one or more values, such as a counter value, of the transmitting device. In this manner, the changes can improve the risk functions of an applet on the transmitting device and reduce or prevent fraudulent activity during the lifetime of the transmitting device. In some examples, server can store the one or more scripts. In other examples, the one or more scripts can be retrieved from a database, such as database. For example, the one or more processors can be configured to transmit a resync value to the transmitting device. In some examples, the one or more processors can be configured to generate the one or more resync values. The one or more processors can be configured to transmit the resync value through a channel. In some examples, the channel can comprise an out-of-band channel.

Figure 5:
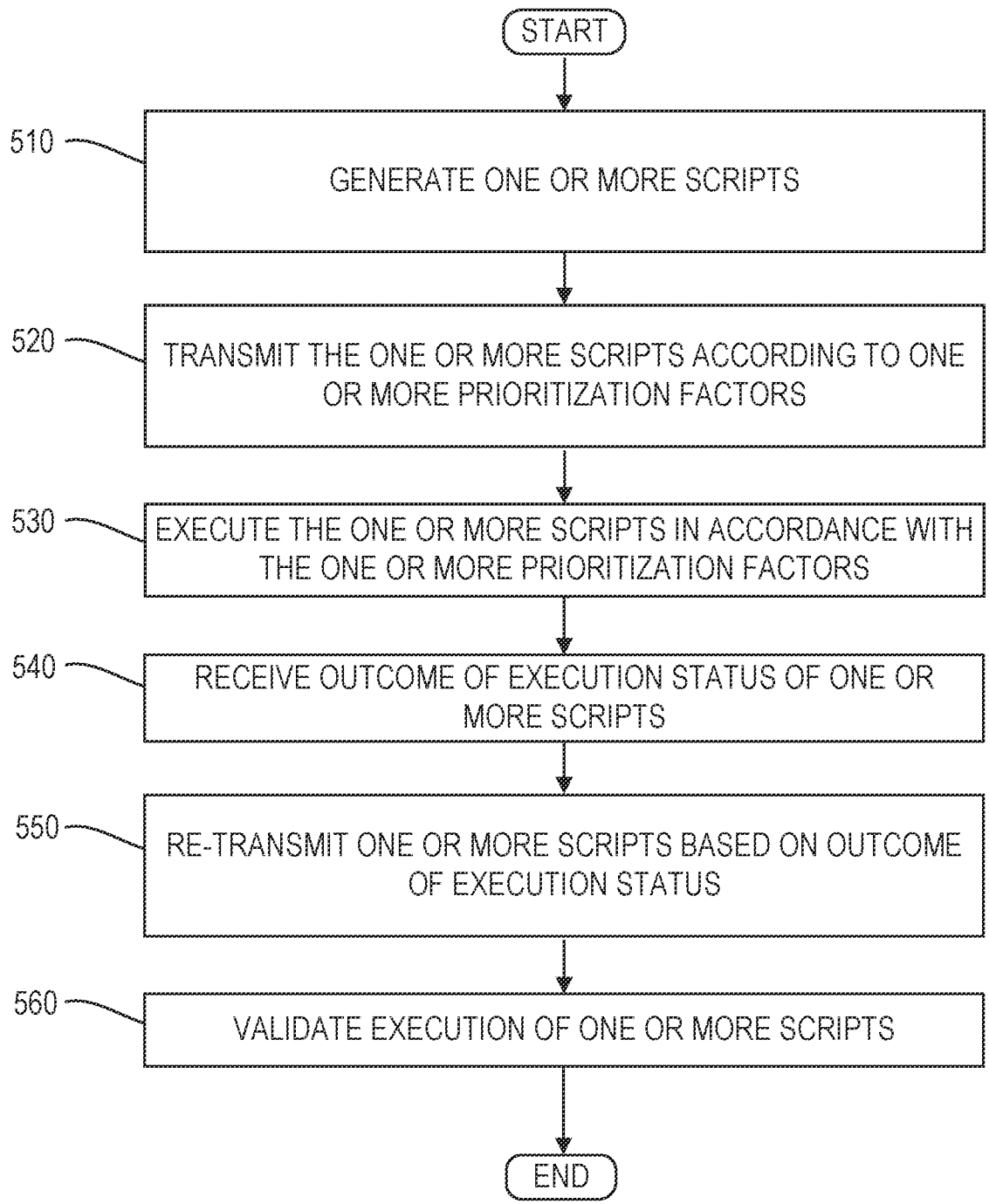
FIG. 5 depicts a method of a validation process of counter resynchronization according to an exemplary embodiment.

FIG. 5 depicts a validation method 500 of counter resynchronization according to an exemplary embodiment. FIG. 5 can reference the same or similar components of system 100, transmitting device 200 of FIG. 2A and FIG. 2B, method 300 of FIG. 3, and method 400 of FIG. 4.

At block 510, the method 500 can include generating one or more scripts. For example, one or more processors of a server can be configured to generate one or more scripts. Without limitation, the one or more scripts can be configured to update and change one or more values, such as a counter value, of the transmitting device. In this manner, the changes can improve the risk functions of an applet on the transmitting device and reduce or prevent fraudulent activity during the lifetime of the transmitting device. In some examples, server can store the one or more scripts. In other examples, the one or more scripts can be retrieved from a database.

At block 520, the method 500 can include transmitting the one or more scripts. For example, one or more processors of a server can be configured to transmit, via one or more scripts, the one or more values to the transmitting device. The one or more scripts can be transmitted as part of an authorization response. For example, the one or more scripts can be sent by an issuer of the transmitting device in a transaction authorization response. The one or more scripts can be generated and/or transmitted on a periodic or predetermined schedule in order to resync counter values that have not been replaced for a predetermined time, including but not limited to any number of seconds, minutes, hours, days, weeks, months, years, etc. In one example, the one or more scripts can be transmitted every day. In another example, the one or more scripts can be transmitted to resync counter values that are 30 days old.

At block 530, the method 500 can include executing the one or more scripts in accordance with one or more prioritization factors. For example, the transmitting device can be configured to receive and execute the one or more scripts in accordance with one or more prioritization factors. In some examples, the method 500 can include employing a first approach in prioritizing when the resync value is transmitted to replace the counter value. The first approach can comprise a reactive approach. For example, one or more processors of a server can be configured to prioritize when the resync value should be transmitted to replace the counter value of the transmitting device. The prioritization can be based on one or more factors. For example, at least one of factors can be associated with a threshold differential in determining whether a particular transmitting device is given preferential treatment to replace its counter value with the resync value from the one or more processors. The one or more processors can be configured to trigger a reset of the counter value of the transmitting device if the counter value yields a desired value. In this manner, prioritization of resyncing the counter value with the one or more processors is based on a reactive approach, since the one or more processors can be configured to determine if the threshold differential is reached, such as the counter value being off by 500 as opposed to the counter value being off by 5.

The method 500 can further include transmitting, based on the outcome of the first approach, the resync value. For example, this can include transmitting, by the one or more processors, the first counter value via one or more scripts to a transmitting device based on the results of the first approach and in response to the plurality of events. In response to the one or more reset events, the one or more processors can be configured to transmit one or more resync values to the transmitting device. For example, the one or more processors can be configured to transmit, via one or more scripts, the one or more resync values to the transmitting device. The one or more scripts can be transmitted as part of an authorization response. For example, the one or more scripts can be sent by an issuer of the transmitting device in a transaction authorization response. The one or more scripts can be generated and/or transmitted on a periodic or predetermined schedule in order to resync counter values that have not been replaced for a predetermined time, including but not limited to any number of seconds, minutes, hours, days, weeks, months, years, etc. In one example, the one or more scripts can be transmitted every day. In another example, the one or more scripts can be transmitted to resync counter values that are 30 days old. Without limitation, the one or more scripts can be configured to update and change one or more values, such as a counter value, of the transmitting device. In this manner, the changes can improve the risk functions of an applet on the transmitting device and reduce or prevent fraudulent activity during the lifetime of the transmitting device. In some examples, server can store the one or more scripts. In other examples, the one or more scripts can be retrieved from a database, such as database. For example, the one or more processors can be configured to transmit a resync value to the transmitting device. In some examples, the one or more processors can be configured to generate the one or more resync values. The one or more processors can be configured to transmit the resync value through a channel. In some examples, the channel can comprise an out-of-band channel.

The method 500 can further include employing a second approach in prioritizing when the resync value is transmitted to replace the counter value. The second approach can comprise a proactive approach. For example, at least one of the factors can comprise the one or more processors configured to trigger a reset of the counter value of the transmitting device after a predetermined time, such as, without limitation, after two weeks or three months. In this manner, prioritization of resyncing the counter value with the one or more processors is based on a proactive approach. In some examples, the one or more processors can be configured to trigger a reset of the counter value of the transmitting device if the transmitting device has been issued within, e.g., the past 8 months. In another example, the one or more processors can be configured to trigger a reset of the counter value of the transmitting device if the counter value has not been reset after, e.g., 4 months.

The method 500 can further include transmitting, based on the outcome of the second approach, the resync value. For example, this can include transmitting, by the one or more processors, the first counter value via one or more scripts to a transmitting device based on the results of the second approach and in response to the plurality of events. In response to the one or more reset events, the one or more processors can be configured to transmit one or more resync values to the transmitting device. For example, the one or more processors can be configured to the transmit, via one or more scripts, the one or more resync values to the transmitting device. The one or more scripts can be transmitted as part of an authorization response. For example, the one or more scripts can be sent by an issuer of the transmitting device in a transaction authorization response. The one or more scripts can be generated and/or transmitted on a periodic or predetermined schedule in order to resync counter values that have not been replaced for a predetermined time, including but not limited to any number of seconds, minutes, hours, days, weeks, months, years, etc. In one example, the one or more scripts can be transmitted every day. In another example, the one or more scripts can be transmitted to resync counter values that are 30 days old. Without limitation, the one or more scripts can be configured to update and change one or more values, such as a counter value, of the transmitting device. In this manner, the changes can improve the risk functions of an applet on the transmitting device and reduce or prevent fraudulent activity during the lifetime of the transmitting device. In some examples, server can store the one or more scripts. In other examples, the one or more scripts can be retrieved from a database, such as database. For example, the one or more processors can be configured to transmit a resync value to the transmitting device. In some examples, the one or more processors can be configured to generate the one or more resync values. The one or more processors can be configured to transmit the resync value through a channel. In some examples, the channel can comprise an out-of-band channel.

At block 540, the method 500 can include receiving an outcome of execution status of the one or more scripts. In some examples, the validation process can include receiving a confirmation indicative of successful execution of the one or more scripts. For example, the one or more processors can be configured to receive, from the transmitting device, that the transmitting device received the one or more scripts and executed the one or more scripts.

At block 550, the method 500 can include re-transmitting the one or more scripts in response to the outcome of execution status of the one or more scripts. For example, this process can include determining or receiving a confirmation indicative of unsuccessful execution of the one or more scripts. If the confirmation is indicative of an unsuccessful execution of the one or more scripts, the one or more scripts can be re-transmitted and/or re-executed up to and including a predetermined number of times before the entire method 500 times out. In some examples, after reaching a predetermined number of failures of the script execution, the transmitting device can be locked and can be substituted by issuance of a replacement transmitting device.

At block 560, the method 500 can include validating execution of the one or more scripts. The one or more processors can be configured to perform a validation process that the resync value was transmitted, received, and executed to replace the counter value of the transmitting device with the resync value. In this manner, the one or more processors can be configured to determine that the one or more scripts successfully executed, and can be configured to troubleshoot any of the above steps if and when the one or more scripts failed to generate, transmit, and/or execute.

It is further noted that the systems and methods described herein can be tangibly embodied in one of more physical media, such as, but not limited to, a compact disc (CD), a digital versatile disc (DVD), a floppy disk, a hard drive, read only memory (ROM), random access memory (RAM), as well as other physical media capable of data storage. For example, data storage can include random access memory (RAM) and read only memory (ROM), which can be configured to access and store data and information and computer program instructions. Data storage can also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files can be stored. The data storage of the network-enabled computer systems can include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which can include a flash array, a hybrid array, or a server-side product, enterprise storage, which can include online or cloud storage, or any other storage mechanism. Moreover, the figures illustrate various components (e.g., servers, computers, processors, etc.) separately. The functions described as being performed at various components can be performed at other components, and the various components can be combined or separated. Other modifications also can be made.

In the preceding specification, various embodiments have been described with references to the accompanying drawings. It will, however, be evident that various modifications and changes can be made thereto, and additional embodiments can be implemented, without departing from the broader scope of the invention as set forth in the claims that follow. The specification and drawings are accordingly to be regarded as an illustrative rather than restrictive sense.

We claim:

1. An authentication counter resynchronization system comprising:
    one or more servers each including a memory and one or more processors, the one or more servers in data communication with a transmitting device, wherein the one or more processors are configured to:
    determine one or more reset events,
    generate a resync value,
    transmit, via one or more scripts, the resync value to the transmitting device according to one or more prioritization factors and in response to the one or more reset events,
    replace an authentication counter value with the resync value in accordance with the one or more prioritization factors, wherein a communicative connection between the transmitting device and a point of sale device triggers the replacement of the authentication counter value, and
    trigger, in response to the one or more reset events, one or more corrective actions, the one or more corrective actions including at least one selected from the group of blocking the data communication, disabling one or more user accounts, and logging one or more records,
    wherein the one or more prioritization factors include triggering a replacement of the authentication counter value when a predetermined time has lapsed since the authentication counter value has been replaced, and
    wherein one of the one or more reset events comprises a counter overflow associated with the resync value and the authentication counter value.

2. The authentication counter resynchronization system of claim 1, wherein one of the one or more reset events comprises exceeding a first threshold differential between the authentication counter value and the resync value.

3. The authentication counter resynchronization system of claim 2, wherein the first threshold differential comprises a value within a first range.

4. The authentication counter resynchronization system of claim 2, wherein one of the one or more reset events comprises exceeding a second threshold differential between the authentication counter value and the resync value, the second threshold differential greater than the first threshold differential.

5. The authentication counter resynchronization system of claim 4, wherein the second threshold differential comprises a second value within a second range.

6. The authentication counter resynchronization system of claim 1, wherein the one or more processors are further configured to transmit the resync value through an out-of-band channel.

7. The authentication counter resynchronization system of claim 1, wherein the one or more processors are further configured to periodically generate and transmit the resync value to the transmitting device.

8. The authentication counter resynchronization system of claim 1, wherein the one or more processors are further configured to perform a validation process, the validation process including receiving a confirmation indicative of successful execution of the one or more scripts.

9. The authentication counter resynchronization system of claim 1, wherein the resync value is configured to increment a predetermined number.

10. A method for authentication counter resynchronization, comprising:
    generating, by one or more processors, a first authentication counter value;
    determining, by the one or more processors, a plurality of reset events;
    transmitting, by the one or more processors, the first authentication counter value via one or more scripts to a transmitting device based on one or more prioritization factors and in response to the plurality of reset events;
    replacing, by the one or more processors, a second authentication counter value of the transmitting device with the first authentication counter value in accordance with the one or more prioritization factors, wherein a communicative connection between the transmitting device and a point of sale device triggers the replacement of the second authentication counter value; and
    triggering, in response to the plurality of reset events, one or more corrective actions by the one or more processors, the one or more corrective actions including at least one selected from the group of blocking data communication with the transmitting device, disabling one or more user accounts, and logging one or more records,
    wherein the one or more prioritization factors include triggering a replacement of the second authentication counter value when a predetermined time has lapsed since the authentication counter value has been replaced, and
    wherein at least one reset event comprises a counter overflow associated with the first authentication counter value and the second authentication counter value.

11. The method of claim 10, wherein at least one reset event comprises exceeding a first threshold differential between the first authentication counter value and the second authentication counter value.

12. The method of claim 11, wherein at least one reset event comprises exceeding a second threshold differential between the first authentication counter value and the second authentication counter value, the second threshold differential greater than the first threshold differential.

13. The method of claim 10, further comprising transmitting the first authentication counter value through an out-of-band channel.

14. The method of claim 10, wherein the one or more scripts are transmitted as part of an authorization response.

15. The method of claim 10, further comprising confirming successful execution of the one or more scripts.

16. The method of claim 10, further comprising triggering, in response to determining the plurality of reset events, a plurality of corrective actions, including at least one selected from the group of blocking data communication with the transmitting device, disabling one or more user accounts associated with the transmitting device, and deactivating the transmitting device.

17. The method of claim 10, wherein the first authentication counter value is configured to increment a predetermined number.

18. A computer readable non-transitory medium comprising computer-executable instructions that are executed on a processor and comprise the steps of:
 determining one or more reset events;
 generating a resync value;
 triggering, based on the one or more reset events, a plurality of corrective actions responsive to the one or more reset events;
 transmitting, via one or more scripts, the resync value to a transmitting device according to one or more prioritization factors;
 replacing an authentication counter value of the transmitting device with the resync value, wherein a communicative connection between the transmitting device and a point of sale device triggers the replacement of the authentication counter value;
 triggering, in response to the one or more reset events, one or more corrective actions by the one or more processors, the one or more corrective actions including at least one selected from the group of blocking data communication with the transmitting device, disabling one or more user accounts, and logging one or more records; and
 validating successful execution of the one or more scripts,
 wherein the one or more prioritization factors include triggering a replacement of the authentication counter value when a predetermined time has lapsed since the authentication counter value has been replaced, and
 wherein one of the one or more reset events comprises a counter overflow associated with the resync value and the authentication counter value.

19. The computer readable non-transitory medium of claim 18, wherein one of the one or more reset events comprises exceeding a first threshold differential between the authentication counter value and the resync value.

20. The computer readable non-transitory medium of claim 19, wherein one of the one or more reset events comprises exceeding a second threshold differential between the authentication counter value and the resync value, the second threshold differential greater than the first threshold differential.

* * * * *